US008533663B2

(12) United States Patent
Moir et al.

(10) Patent No.: US 8,533,663 B2
(45) Date of Patent: Sep. 10, 2013

(54) SYSTEM AND METHOD FOR UTILIZING AVAILABLE BEST EFFORT HARDWARE MECHANISMS FOR SUPPORTING TRANSACTIONAL MEMORY

(75) Inventors: Mark S. Moir, Windham, NH (US); David Dice, Foxboro, MA (US)

(73) Assignee: Oracle America, Inc., Redwood City, CA (US)

( * ) Notice: Subject to any disclaimer, the term of this patent is extended or adjusted under 35 U.S.C. 154(b) by 1367 days.

(21) Appl. No.: 12/250,409

(22) Filed: Oct. 13, 2008

(65) Prior Publication Data
US 2009/0282386 A1 Nov. 12, 2009

Related U.S. Application Data

(60) Provisional application No. 61/052,542, filed on May 12, 2008.

(51) Int. Cl.
*G06F 9/44* (2006.01)
*G06F 9/45* (2006.01)

(52) U.S. Cl.
USPC ............ 717/106; 711/147; 711/152; 711/154

(58) Field of Classification Search
None
See application file for complete search history.

(56) References Cited

U.S. PATENT DOCUMENTS

| 7,395,382 | B1 * | 7/2008 | Moir ............................. 711/147 |
| 7,669,015 | B2 | 2/2010 | Dice et al. |
| 7,809,903 | B2 * | 10/2010 | Adl-tabatabai et al. ...... 711/159 |
| 7,856,537 | B2 * | 12/2010 | Kumar et al. ................. 711/152 |
| 7,870,545 | B2 * | 1/2011 | Saha et al. ..................... 717/159 |
| 7,966,459 | B2 * | 6/2011 | Nussbaum et al. ........... 711/154 |
| 8,074,030 | B1 * | 12/2011 | Moir et al. ..................... 711/147 |
| 2004/0015502 | A1 * | 1/2004 | Alexander et al. ............ 707/100 |
| 2007/0186056 | A1 * | 8/2007 | Saha et al. ..................... 711/144 |
| 2008/0288726 | A1 * | 11/2008 | Heller, Jr. ..................... 711/147 |
| 2009/0031309 | A1 * | 1/2009 | Lev ............................... 718/101 |
| 2009/0031310 | A1 * | 1/2009 | Lev et al. ...................... 718/101 |
| 2009/0125548 | A1 | 5/2009 | Moir et al. |
| 2009/0172299 | A1 * | 7/2009 | Goodman et al. ............ 711/147 |
| 2009/0172306 | A1 | 7/2009 | Nussbaum et al. |

OTHER PUBLICATIONS

"Hybrid Transactional Memory", Kumar et al., 2006 ACM 1-59593-189-9/06/0003.*

(Continued)

*Primary Examiner* — Insun Kang
*Assistant Examiner* — Daxin Wu
(74) *Attorney, Agent, or Firm* — Robert C. Kowert; Meyertons, Hood, Kivlin, Kowert & Goetzel, P.C.

(57) ABSTRACT

Systems and methods for managing divergence of best effort transactional support mechanisms in various transactional memory implementations using a portable transaction interface are described. This interface may be implemented by various combinations of best effort hardware features, including none at all. Because the features offered by this interface may be best effort, a default (e.g., software) implementation may always be possible without the need for special hardware support. Software may be written to the interface, and may be executable on a variety of platforms, taking advantage of best effort hardware features included on each one, while not depending on any particular mechanism. Multiple implementations of each operation defined by the interface may be included in one or more portable transaction interface libraries. Systems and/or application software may be written as platform-independent and/or portable, and may call functions of these libraries to implement the operations for a targeted execution environment.

20 Claims, 7 Drawing Sheets

(56) References Cited

OTHER PUBLICATIONS

"An Effective Hybrid Transactional Memory System with Strong Isolation Guarantees"; Minh et al., 2007 ACM 978-1-59593-706-03/07/0006.*

"Code Generation and Optimization for Transactional Memory Constructs in an Unmanaged Language"; Wang et al., International Symposium on Code Generation and Optimization (CGO'07).*

"Hybrid Transactional Memory", Damron et al., ASPLOS'06 Oct. 21-25, 2006.*

PhTM: Phased Transactional Memory; Lev, et al., TRANSACT 2007.*

"Architectural Support for Software Transactional Memory", Saha et al, The 39th Annual IEEE/ACM International Symposium on Microarchitecture, 2006.*

"Software Transactional Memory for DynamicSized data structures", Herlihy et al., ACM, Jul. 13-16, 2003.*

"Hybrid Hardware/Software Transactional Memory", Mark Moir, 2005.*

"Software Transactional Memory for Dynamic-Sized Data Structures", Herlihy et al., ACM 1-58113-708-7/03/0007, Jul. 13-16, 2003.*

"A Flexible Framework for Implementing Software Transactional Memory", Herlihy et al., ACM 1-59593-348-4/06/0010, Oct. 22-26, 2006.*

Alert-on-update: A communication aid for shared memory multiprocessors. Spear, Shriraman, Hossain, Dwarkadas, and Scott. 12th ACM SIGPLAN symposium on Principles and practice of parallel programming.

Hybrid Transactional Memory. ACM Symposium on Architectural Support for Programming Languages and Operating Systems, 2006. Damron, Fedorova, Lev, Luchangco, Moir, Nussbaum, 11 pages.

PhTM: Phased Transactional Memory. Transact Workshop 2007. Lev, Moir, and Nussbaum.

Implementing Multi-word Atomic Snapshots on Current Hardware. Chris Purcell, Tim Harris. 2004 PODC: 23th ACM SIGACT-SIGOPS Symposium on Principles of Distributed Computing, 1 page.

Deconstructing Transactions: the subtleties of atomicity. C. Blundell, E. Lewis, M. Martin. Fourth annual workshop on Duplicating, Deconstructing, and Debunking, 2005. (WDDD'05), 7 pages.

Store Memory-Level Parallelism Optimizations for Commercial Applications. Yuan Chou, Lawrence Spracklen and Santosh G. Abraham. 38th Annual IEEE/ACM International Symposium on Microarchitecture (MICRO'05), 2005. pp. 183-196.

Bratin Saha, Ali-Reza Adl-Tabatabai, Quinn Jacobson: Architectural Support for Software Transactional Memory. International Symposium on Microarchitecture, 2006. pp. 185-196.

Dice, et al., "Transactional Locking II," from 20th International Symposium on Distributed Computing, Sep. 2006, 15 pages.

David Dice, et al., "What Really makes Transactions Faster?," First ACM SIGPLAN Workshop on Languages, Compilers, and Hardware Support for Transactional Computing (TRANSACT'06), Jun. 11, 2006, Ottawa, Canada, 11 pages.

Gordon B. Bell, et al, "Deconstructing Commit," from IEEE International Symposium on Performance Analysis of Systems and Software. 2004, 10 pages.

Luis Ceze, et al., "Bulk Disambiguation of Speculative Threads in Multiprocessors," from The 33rd Annual International Symposium on Computer Architecture. Jun. 2006, 12 pages.

* cited by examiner

SYSTEM AND METHOD FOR UTILIZING AVAILABLE BEST EFFORT HARDWARE MECHANISMS FOR SUPPORTING TRANSACTIONAL MEMORY

This application claims benefit of priority of U.S. Provisional Application Ser. No. 61/052,542 entitled "System and Method for Convergence of Best Effort Hardware Mechanisms for Supporting Transactional Memory," filed May 12, 2008, the content of which is incorporated by reference herein in its entirety.

BACKGROUND OF THE INVENTION

1. Field of the Invention

This invention relates generally to concurrent access to shared objects, and more particularly to a system and method for implementing a transactional memory that includes multiple, distinct, best effort support mechanisms, integrated in a single transactional memory implementation.

2. Description of the Related Art

The multi-core revolution currently in progress is making it increasingly important for applications to exploit concurrent execution in order to take advantage of advances in technology. In concurrent software designs and implementations, it is often important to ensure that one thread does not observe partial results of an operation that is concurrently being executed by another thread. Such assurances are important for practical and productive software development because without them, it can be extremely difficult to manage the interactions of concurrent threads. Typical concurrent programming practices, such as those based on locks and condition variables, are inadequate for this task. Locks do not compose, and introduce troublesome tradeoffs between complexity, performance, and scalability. Furthermore, locks are subject to deadlock if not used carefully.

Transactional memory is a paradigm that allows the programmer to design code as if multiple locations can be accessed and/or modified in a single atomic step. As typically defined, a transactional memory interface allows a programmer to designate certain sequences of operations as "atomic blocks" and "transactions," which are guaranteed by the transactional memory implementation to either take effect atomically and in their entirety (in which case they are said to succeed), or have no externally visible effect (in which case they are said to fail). Thus, with transactional memory, it may be possible in many cases to complete multiple operations with no possibility of another thread observing partial results, even without holding any locks, or without the programmer needing to determine what locks should be held, the order in which they are acquired, etc. The transactional memory paradigm can significantly simplify the design of concurrent programs.

Transactional Memory (TM) allows programmers to use transactional or atomic blocks, which may be considered sequential code blocks that should be executed atomically. In other words, executions of atomic blocks by different threads do not appear to be interleaved. To execute an atomic block, the underlying system may begin a transaction, execute the atomic block's memory accesses using that transaction, and then try to commit the transaction (i.e., to attempt to copy back results of the transaction to shared memory). If the transaction commits successfully, the atomic block's execution seems to take effect atomically at the transaction's commit point. If it fails, the execution does not seem to take effect at all and the atomic block might be retried using a new transaction. It is the responsibility of the TM implementation to guarantee the atomicity of operations executed by transactions.

Transactional memory is widely recognized as a promising paradigm for allowing a programmer to make updates to multiple locations in a manner that is apparently atomic, while addressing many of the problems associated with the use of locks. In general, transactional memory can be implemented in hardware (HTM), with the hardware directly ensuring that a transaction is atomic, or in software (STM) that provides the "illusion" that the transaction is atomic, even though in fact it is executed in smaller atomic steps by the underlying hardware. While HTM solutions are generally faster than STM ones, so-called "best effort" HTM implementations may not be guaranteed to be able commit any particular transaction, in which case a programmer cannot rely solely on HTM, even if it is almost always effective.

Typically, systems implement or support only a single type of transactional memory implementation. Most existing transactional memory implementations are designed and optimized for one situation, and may not perform well or be applicable in others, e.g., those in different environments, those with different workloads, etc. Recently developed Hybrid Transactional Memory (HyTM) implementations allow transactions to be executed using hardware transactional memory if it is available and when it is effective, or using software transactional memory otherwise. Hybrid transactional memory techniques are described in U.S. Pat. No. 7,395,382, entitled "Hybrid Software/Hardware Transactional Memory," and naming Mark S. Moir as inventor, which is herein incorporated by reference in its entirety. In the HyTM implementations described therein, both hardware and software transactions include significant overhead in order to facilitate detection and resolution of conflicts between different types of transactions. In some such implementations, software transactional memories can exploit various "best effort" hardware mechanisms to improve performance when such mechanisms are effective, but can operate without them when they are not. Different best effort mechanisms have been proposed by different organizations. However, if different mechanisms are implemented for different platforms, it will be difficult for programmers to write software that is portable but takes advantage of any best effort mechanisms provided by these different platforms.

SUMMARY

Transactional memory (TM) may support code sections that are to be executed atomically, i.e., so that they appear to be executed one at a time, with no interleaving between the steps of one transaction and another. This may allow programmers to write code that accesses and/or modifies multiple memory locations in a single atomic step, significantly reducing the difficulty of writing correct concurrent programs. As noted above, transactional memory implementations may support software transaction methods, hardware transaction methods, or both hardware and software methods, in various embodiments.

The systems and methods described herein may be used to implement transactional memories that include two or more best effort transactional memory support mechanisms (e.g., best effort HTM mechanisms) that are integrated such that the overhead associated with support of multiple mechanisms may be reduced and/or the performance of the transactional memories may be improved over transactional memories that include any one of the mechanisms, or an un-integrated collection of multiple such mechanisms. In some embodiments, the systems and methods described herein may allow a single attempt to execute a transaction to employ two or more such mechanisms, which may be used serially or concurrently within a single iteration. In other words, the system and methods described herein may differ from those of the HyTM implementations described above at least in that two or more best effort HTM mechanisms may be employed in a single transaction attempt (e.g., without aborting and/or retrying the transaction). In various embodiments, the integration of two best effort mechanisms may or may not provide a guarantee that the transaction will eventually succeed using only the integrated mechanisms.

In various embodiments, state maintained or used by a first mechanism employed in execution of a given transaction may be shared with or transferred to another mechanism for concurrent and/or subsequent use in execution of the transaction. For example, two best effort mechanisms may have access to a common location storing information regarding the state of a transaction and/or state associated with locations accessed by the transaction (e.g., a cache marking bit). In another example, a value may be written to a designated location (e.g., one configured to store state information associated with the progress of a given attempt to execute a transaction) by a first mechanism and may be read by a second mechanism (e.g., so that the second mechanism may take over the attempt to execute the transaction at the point at which the first mechanism discontinued its effort to execute the transaction). Such state sharing and/or transfer may in some embodiments be performed automatically by the integrated best effort mechanisms (e.g., without user, programmer, or software intervention).

In various embodiments, the system may support Read Set Monitoring (RSM), cache marking, a Bloom filter-type mechanism, and/or various best effort hardware transactional memory (BEHTM) mechanisms (which may be usable to attempt to commit a transaction). Note that various embodiments of an RSM-type mechanism are described in co-pending U.S. patent application Ser. No. 11/475,604, entitled "Methods and Apparatus to Implement Parallel Transactions," filed Jun. 27, 2006, and naming David Dice and Nir N. Shavit as inventors, which is herein incorporated by reference in its entirety. In some embodiments, a compiler may generate calls to a run-time transactional support library to help implement one or more of the best effort mechanisms and/or to help implement default, standard, and/or last-resort transactional memory techniques (e.g., when best effort mechanisms are unavailable or are otherwise unsuccessful). In some embodiments, one or more of the best effort mechanisms may provide a guarantee of no false positive results, no false negative results, or no transaction failures, and may be configured to provide an indication of such a guarantee to the runtime system (e.g., in response to a query by the runtime system). The runtime system may then determine an appropriate best effort mechanism to apply to a given transaction attempt, dependent on the received indication.

In some embodiments, software containing one or more transactions may target a single interface that can be supported in a variety of platforms. In this way the software may take advantage of the features implemented by different platforms, but without depending on any one of the features. For example, such an interface may allow software to be configured to take advantage of different best effort hardware features for supporting transactional memory in different platforms, while remaining portable across a variety of platforms. Such an interface may also assist in the incremental evolution of different platforms, so that these platforms can adopt different hardware features in different orders, and use different instructions and interfaces, without requiring system software and applications to be individually targeted to each platform and/or platform version. The use of a standard interface may enable portability of hardware-assisted transactional memory systems to a variety of platforms with different processors and/or produced by different organizations, allowing portable software to take advantage of whichever features are available.

A software interface, herein referred to as a "Portable Transaction Interface", may be implemented using a variety of combinations of best effort hardware features, including none at all (i.e., in this case, the interface may be implemented entirely by software, without special hardware support). The features offered by this interface may be specified as "best effort" mechanisms, for which a trivial implementation is always possible without the need for special hardware support, in some embodiments. As described herein, software may be written to this interface, and may be executable in a variety of execution environments (e.g., on a variety of platforms), taking advantage of whichever best effort hardware features are included on each one, while not depending on any particular one.

Figure 1:
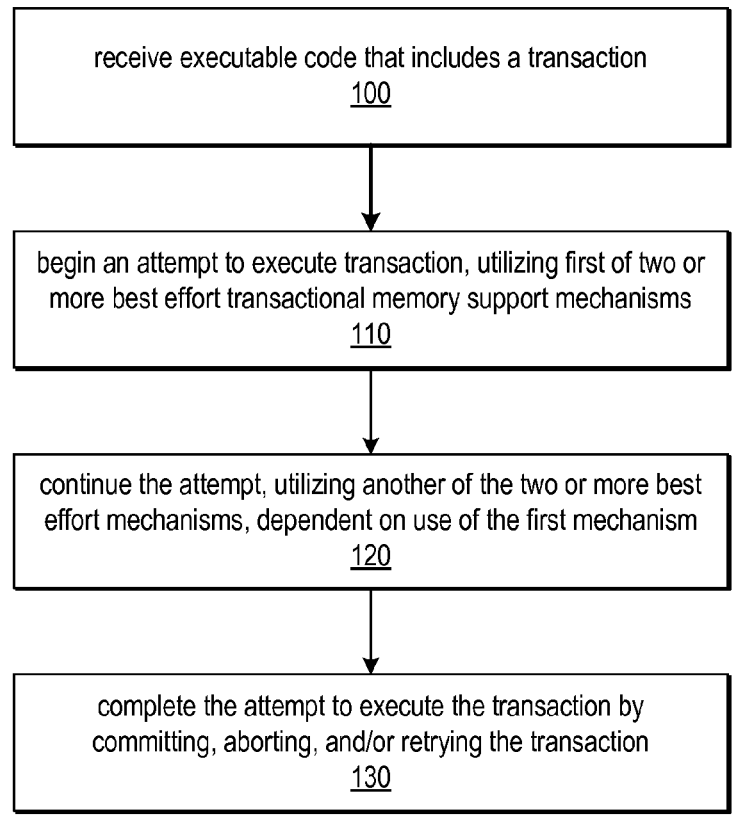
FIG. 1 is a flow diagram illustrating one embodiment of a method for utilizing integrated best effort transactional memory support mechanisms, as described herein.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must).

Similarly, the words "include", "including", and "includes" mean including, but not limited to.

DETAILED DESCRIPTION OF EMBODIMENTS

Transactional memory is widely considered to be the most promising avenue for addressing issues facing concurrent programming and execution. Using transactional memory, programmers may specify what should be done atomically, rather than how this atomicity should be achieved. The transactional memory implementation may then be responsible for guaranteeing the atomicity, largely relieving programmers of the complexity, tradeoffs, and software engineering problems associated with traditional lock-based programming approaches.

Transactional memory (TM) is an emerging technology for making it easier to develop multithreaded programs that are scalable, efficient, and correct. Using TM, programmers may delimit critical sections of code, for example by designating "atomic blocks", as in the pseudo-code below:

```
atomic {
    critical section of code here
}
```

In this example, the system may ensure that the critical section appears to be executed atomically (i.e., either the entire critical section takes effect or none of it does, and critical sections do not appear to be interleaved with one another).

As previously noted, TM promises significant simplifications to multithreaded programming, as compared to the more traditional approach of lock-based synchronization. In systems employing lock-based synchronization, programmers must specify how to achieve such atomicity, e.g., by associating each critical section with a mutual exclusion lock, establishing conventions for which locks must be acquired by which critical sections in order to ensure correctness, and specifying in what order the locks should be acquired in order to avoid deadlock.

The traditional lock-based approach to multithreaded programming has a variety of well-known problems associated with it, and as a result multithreaded programming has long been considered the domain of an elite class of expert programmers. As the computer industry quickly shifts towards multi-core systems, everyday programmers must be able to develop robust and reliable multithreaded code. Therefore, new programming paradigms are needed to make this task significantly easier.

As noted above, transactional memory may be implemented in hardware, in software, or in a combination of the two, in various embodiments. Hardware transactional memory (HTM) designs may be characterized as unbounded, bounded, or best effort implementations. For example, a bounded HTM may have a fixed-size, fully associative transactional cache, and a transaction may be committed if and only if it fits in that cache. Alternative best effort designs may piggyback on existing caches and other hardware structures such as store buffers, and therefore may be able to commit one large transaction while being unable to commit another significantly smaller one, depending on how the transactions happen to map to the existing structures. Such best effort HTMs may not be required to make particular guarantees about what transactions can commit, and therefore may be substantially easier to design than bounded HTMs, because difficult corner cases may be handled by simply aborting a transaction.

If used directly, both bounded and best effort HTM designs may impose unreasonable constraints on programmers because programmers may need to take into account the number or distribution of cache lines accessed by a transaction. Furthermore, the details of such constraints may vary from one machine to another, so programs that must respect those constraints may not be portable. Recently, proposals for "unbounded" HTM have appeared in the literature in an effort to overcome the shortcomings of bounded and best effort HTM designs. Unfortunately, however, these designs typically entail substantially more complexity than the much simpler best effort implementations, making them difficult to integrate into commercial processors.

Software transactional memory (STM) implementations, in which the transactional memory is implemented entirely in software without special hardware support, may provide software engineering benefits similar to those provided by HTM. In STM implementations, coordination between conflicting concurrent transactions is mediated using software. Therefore, STM implementations may be built and used in existing systems without hardware modification. Because STM may be independent of hardware structures such as caches and store buffers, STM implementations may not be subject to the limitations of bounded and best effort HTMs described above. However, STM implementations are typically one to two orders of magnitude slower than HTM implementations, and a substantial performance gap between HTM and STM is likely to remain.

Hybrid Transactional Memory (HyTM) was designed to take advantage of the flexibility and generality of STM, but also to exploit HTM support (if it is available and when it is effective) to boost performance. A HyTM implementation minimally comprises a fully functional STM implementation, because it must work even if there is no HTM support available. Thus, using a HyTM implementation, any transaction may be executed in a software transactional memory mode without special hardware support (e.g., using only instructions that are standard in existing systems). The use of HyTM may allow programmers to develop, test, and execute programs that include transactions using existing systems (i.e., without hardware modification). For example, a program may be written and largely debugged even before HTM support is available in a system on which it is targeted for execution. On the other hand, a HyTM implementation may provide a way to execute transactions using bounded or best effort HTM support if it is available. This way, significant performance improvements may be possible with HTM support if many transactions can be committed by the HTM, even if some of them must be executed in a software-only mode due to limitations of the HTM support.

In one embodiment of a HyTM system, transactional load and store operations in transactions that are executed using HTM support are augmented with additional code to check for conflicts with concurrent software transactions. This may impose significant overhead on transactions executed using HTM. In some embodiments of HyTM, transactions executed in a software mode may also need to maintain and expose information sufficient to allow transactions executed using HTM to detect conflicts with concurrent software transactions, thereby imposing overhead and constraints on the design of the STM component of the HyTM system.

Sun Microsystems, Inc., (hereinafter "Sun") and others in industry and academia have invested substantial effort researching mechanisms to support TM in recent years. Sun has been the first to provide hardware support for TM in a mainstream commercial processor (e.g., in Sun's forthcoming multithreaded multi-core processor). This processor supports a form of best effort hardware transactional memory (BEHTM), in which a critical section of code may be executed atomically by the hardware, but may also fail to complete, in which case it does not take effect at all. This mechanism requires software to use an alternative mechanism to achieve the desired effect in the event of a failure of the hardware transaction (perhaps after retrying the hardware transaction some number of times).

In general, BEHTM mechanisms, exemplified by the HTM feature(s) of Sun's forthcoming multithreaded multi-core processor, may provide a way for software to execute a sequence of instructions atomically. BEHTM mechanisms may in some embodiments be limited in the size, duration, and functionality of transactions they support, and may fail if resources are exceeded, if unsupported functionality is attempted, if they execute for too long, or if they encounter disruptive events such as exceptions and interrupts.

A so-called best effort approach may provide HTM support that starts modestly and improves over time, allowing software that uses it to improve in performance over time without the code needing to change in order to take advantage of improvements in hardware. This approach to exploiting BEHTM may be used in a variety of contexts, ranging from improving the performance and scalability of existing legacy code, to supporting new transactional programming paradigms in which programmers explicitly use new language features such as the designation of atomic blocks mentioned above.

In the latter case, to allow programmers to enjoy the benefits of BEHTM without needing to know and think about the specific capabilities and limitations of particular BEHTM features, Sun and others have proposed forms of software transactional memory (STM) that can exploit special hardware features to improve performance if they are available, but can also operate in existing systems today, without depending on such special features. This approach may fit well with best effort hardware support, because the software used in such systems may be configured to work despite any arbitrary limitations of any underlying hardware support.

Although a number of proposals have emerged for "hardware-assisted" STMs that make use of special best effort hardware features to improve performance, there is no clear consensus about exactly which best effort hardware feature(s) should be implemented. Different mechanisms with different benefits and different levels of hardware complexity have been proposed. For example, a number of organizations (including Sun) have proposed various forms of what may be referred to as "Read Set Monitoring" (RSM) mechanisms. RSM mechanisms may provide a way for software to determine that a set of locations read previously have not since changed value, without the need to repeatedly reread them or to synchronize on metadata, either of which may result in significant overhead and impact scalability and complexity.

Typical approaches to implementing RSM-like features may be based on exploiting existing cache coherence protocols. For example, in some embodiments, while a monitored location remains in a local cache (or continues to be owned in shared or exclusive mode by the local thread), the value of that location cannot have changed. Before another thread can change the value of that location, it must send a coherence request to the local cache. Before processing this request, the processor may determine that the value may change, and may inform the thread that is monitoring the location (e.g., by generating a trap). Alternatively, the thread may simply update some state to reflect the change, and the monitoring thread may learn of the change by subsequently querying that state. Hardware implementations of such RSM mechanisms are known, as are similar features referred to as "alert-on-update" mechanisms, in which execution is interrupted (e.g., by a trap) when a monitored location may have changed. Persons skilled in the art will appreciate that a variety of alternative RSM implementation approaches are possible, and that the invention disclosed herein may be adapted to different RSM implementations, in different embodiments.

The systems and methods described herein may not merely provide multiple, distinct best effort transactional support mechanisms, but may also integrate them in such a way that the value of the combination is greater than the combined values of the individual mechanisms. In some embodiments this is due, at least in part, to the ability (through the integration of the mechanisms) to transfer information (e.g., state information) maintained and/or used by one of the mechanisms during execution of a given transaction to another of the mechanisms. In this way, the transferred information may be used by the other mechanism in a subsequent operation during execution of the given transaction. In some embodiments, two (or more) best effort transactional support mechanisms may be integrated such that they may be employed in a single attempt at execution of a given transaction (e.g., in a single pass, without aborting and/or retrying the transaction from the beginning between the application of the two mechanisms).

The system and methods described herein for integrating multiple best effort transactional memory support mechanisms in a single transactional memory implementation may be illustrated by the flow chart of FIG. 1, according to one embodiment. In this example, an execution environment (e.g., a computer system configured to support one or more transactional memory implementations) receives executable code that includes a transaction, as in 100. An attempt to execute the transaction may begin, utilizing a first one of two or more integrated best effort transactional memory support mechanisms, as described above. This is illustrated as 110.

In the example illustrated in FIG. 1, the attempt to execute the transaction may continue, and may utilize another of the two or more integrated best effort support mechanisms, as in 120. In some embodiments, the second best effort mechanism may be invoked without aborting the transaction or retrying (e.g., re-starting) execution of the transaction. For example, at some point during a single attempt to execute the transaction, the system may employ a second best effort mechanism instead of, or in addition to, the first best effort mechanism, in order to continue the current execution attempt. In one embodiment, a second best effort mechanism may take over the current attempt to execute the transaction from the first best effort mechanism, and may be dependent on the first mechanism. For example, the second mechanism may be invoked in order to make additional progress following any actions taken by the first mechanism, and its application (e.g., its actions and/or results) may be dependent on progress made (so far) by the first mechanism. In another example, a second best effort mechanism may be utilized concurrently with a first best effort mechanism. In such embodiments, the two mechanisms may be integrated such that they are dependent on each other.

As shown at 130, the current attempt to execute the transaction may end when the transaction is committed (e.g. if the attempt is successful), is aborted (if not), or is retried (e.g., when another attempt to execute the transaction is initiated by re-starting the execution from the beginning subsequent to the current attempt being aborted and/or following detection of any of various error conditions).

Figure 2:
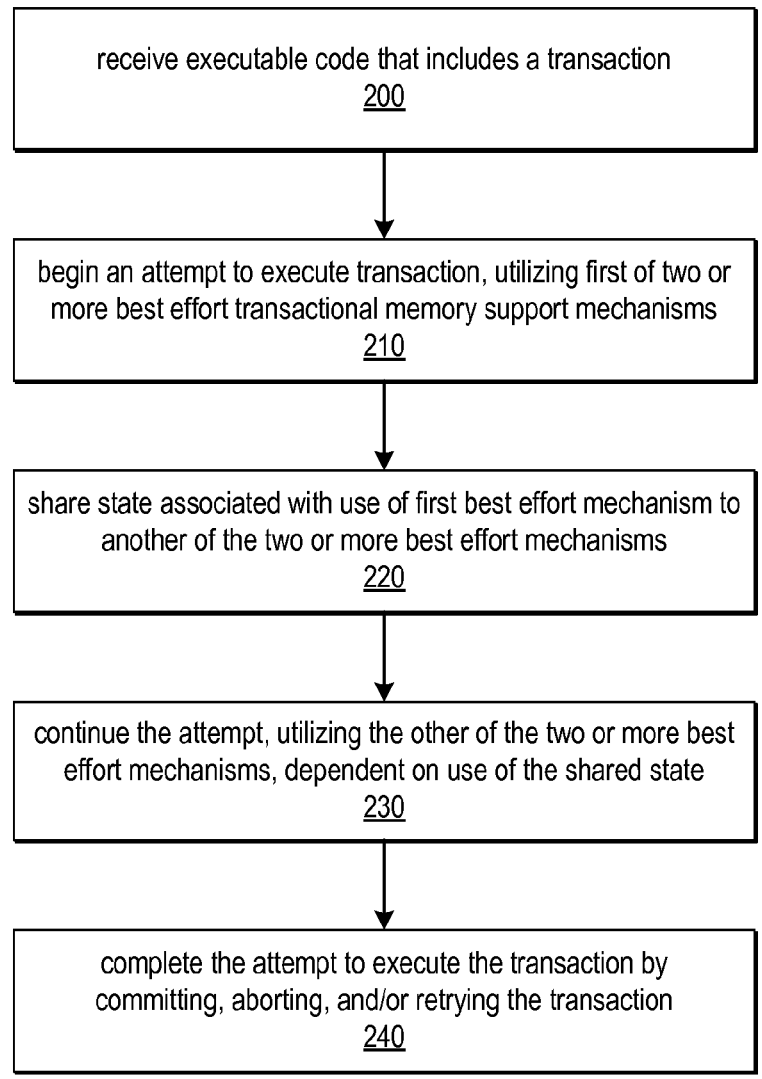
FIG. 2 is a flow diagram illustrating one embodiment of a method for utilizing integrated best effort transactional memory support mechanisms in which the mechanisms share state.

In different embodiments, the integration of two or more best effort transactional support mechanisms may be implemented in different ways. For example, the two mechanisms may be integrated such that they share state related to the execution of the transaction, such that state is transferred from one mechanism to the other, or such that they are otherwise dependent on each other. FIG. 2 illustrates a method for utilizing integrated best effort transactional memory support mechanisms in which the mechanisms share state, according to one embodiment. In this example, an execution environment (e.g., a computer system configured to support one or more transactional memory implementations) receives executable code that includes a transaction, as in 200. An attempt to execute the transaction may begin, utilizing a first one of two or more integrated best effort transactional memory support mechanisms, as described above. This is illustrated as 210.

During the attempt to execute the transaction, state maintained and/or used by the first of the best effort support mechanisms may be transferred to a second one of the best effort support mechanisms for its use, as in 220. In some embodiments, this transfer may take place automatically and without programmer, user, and/or software intervention. For example, the first best effort support mechanism may be a hardware mechanism configured to maintain state and to make this state available to the second mechanism. Similarly, the second mechanism may be a hardware mechanism configured to access and/or obtain state information maintained and/or used by the first mechanism. In some embodiments, state transferred from the first mechanism to the second mechanism may be guaranteed not to change between its transfer and the use of the transferred state by the second mechanism.

As illustrated in FIG. 2, at some point the attempt to execute the transaction may continue, and may utilize the second of the two or more integrated best effort support mechanisms, as in 230. As described above, the second best effort mechanism may be invoked without aborting the transaction or retrying (e.g., re-starting) execution of the transaction. For example, at some point during a single attempt to execute the transaction, the system may employ a second best effort mechanism instead of, or in addition to, the first best effort mechanism, in order to continue the current execution attempt. As described above, the second best effort support mechanism may be configured to use the transferred state information in supporting execution of the transaction. In one embodiment, a second best effort mechanism may take over the current attempt to execute the transaction from the first best effort mechanism, and may be dependent on state transferred from first mechanism. For example, the second mechanism may be invoked in order to make additional progress following any actions taken by the first mechanism, and its application (e.g., its actions and/or results) may be dependent on progress made (so far) by the first mechanism (which in some embodiments may be indicated by the shared state). In another example, a second best effort mechanism may be utilized concurrently with a first best effort mechanism, and the second mechanism may utilize state shared by the first mechanism (e.g., information stored in a location accessible by both mechanisms).

As shown at 240, the current attempt to execute the transaction may end when the transaction is committed (e.g. if the attempt is successful), is aborted (if not), or is retried (e.g., re-attempted subsequent to being aborted and/or following detection of any of various error conditions). Note that in some embodiments, if the transaction fails to commit, the operations illustrated in FIG. 2 may be repeated in one or more additional attempts to execute the transaction. In such embodiments, the same two best effort mechanisms may be employed in the additional attempts, or different best effort mechanisms may be employed in one or more of the additional attempts (e.g., dependent on progress made by one or more of the best effort mechanisms during a current or previous attempt, dependent on changes in the workload, etc.). In some embodiments, one or a configurable number of additional attempts may be made to employ best effort hardware mechanisms before resorting to the use of STM, or another guaranteed transactional memory mechanism, to execute the transaction. In other embodiments, STM (or another standard, default, or last-resort mechanism) may be invoked in response to the failure of a single attempt to execute a transaction using two (or more) best effort hardware mechanisms, as described herein.

The approach of integrating multiple best effort transactional memory support mechanisms described herein may be generally applicable to a wide variety of combinations of best effort hardware transactional support mechanisms and features, some of which are described in detail herein. In some embodiments, more than two such best effort mechanisms may be supported and/or available in the system, and these mechanisms may be employed in different combinations (two or more at a time) to various attempts to execute a given transaction.

The use of two or more integrated best effort hardware mechanisms in executing transactions is illustrated in more detail below by way of a concrete example. In this example, a single transactional memory implementation may be configured to support the integration of a Read Set Monitoring (RSM) mechanism and Best Effort Hardware Transactional Memory (BEHTM) techniques. Detailed descriptions of each of these distinct mechanisms are found below, followed by a description of their integration in a single transactional memory implementation, according to one embodiment.

One of the most challenging aspects of implementing a robust high-performance STM system may be ensuring that the set of values read by a transaction is consistent. In typical STM systems, transactions that modify memory locations must also modify associated metadata, and transactions that read these locations must either:

read and record values from memory and/or associated metadata, and reread them later to determine whether or not they have since changed or modify associated metadata so that a transaction that modifies a location may determine that a transaction has read the location, and may take action to ensure that the reading transaction is informed of the change.

Both approaches outlined above may include significant challenges. In general, it may be necessary to confirm that the set of locations read is consistent (which may be referred to as "validating" the transaction) at commit time, and also to ensure that while the transaction is executing it does not behave incorrectly due to having read inconsistent data from memory. Thus, the first class of approaches may have substantial overhead, because the set of locations read (and/or associated metadata) must be reread repeatedly during execution of the transaction. On the other hand, the second class of approaches may require transactions that are reading a location to modify associated metadata, which may have a severe impact on scalability. In such embodiments, heavy read sharing at the application level may also result in heavy write sharing on the metadata.

Substantial research effort has been invested in STM design to overcome this difficult tradeoff. Some progress has been made (including by Sun), but the challenge of ensuring read set consistency continues to be a dominant one in STM designs, and none of the proposals to date entirely addresses the problem in an efficient and scalable way.

Hardware support for read set monitoring (RSM) may offer a compelling way out of this difficult problem, in some embodiments. For example, if hardware can assure software that a set of monitored locations has not changed, this may largely eliminate the above-described overhead and/or the complexity associated with ensuring this in software. Because of resource constraints and the need to avoid undue hardware complexity, RSM-like proposals may generally be implemented as best effort mechanisms, in that they provide only a conservative approximation to the question of whether any of the monitored locations has changed. Therefore, in some embodiments, software may be configured to function correctly even if the RSM feature sometimes (and perhaps repeatedly) incorrectly reports that one or more of the monitored locations may have changed.

Generally, during execution of a software transaction that is assisted by an RSM-like feature, the software may instruct the RSM feature to monitor the locations read by the transaction (and/or associated metadata). Depending on the interface of the particular RSM feature, the software transaction may receive a trap when a monitored location may have changed, or may "poll" the RSM feature (e.g., by periodically invoking a lightweight operation that reports information sufficient to determine whether any of the monitored locations may have changed). Either way, the overhead of ensuring read set consistency during transactional execution may be expected to be substantially lower than when employing the various software mechanisms summarized above.

A number of proposals for using BEHTM-like mechanisms to improve STM performance have emerged, such as those pioneered by the Scalable Synchronization Research Group in Sun Labs. These include Hybrid Transactional Memory, as described above, and Phased Transactional Memory. Phased transactional memory techniques are described in co-pending U.S. patent application Ser. No. 11/967,371, entitled "System and Method for Supporting Phased Transactional Memory Modes," filed Dec. 31, 2007, and naming Daniel S. Nussbaum and Mark S. Moir as inventors, which is herein incorporated by reference in its entirety. Using these techniques, user transactions may be executed as hardware transactions that are modified (e.g., by a compiler) to interact correctly with transactions executed in software. These approaches may be used to execute entire user transactions using BEHTM when possible, and to (eventually) resort to executing transactions in software if they do not succeed using hardware mechanisms. Such software transactions may in some embodiments benefit from the use of RSM-like features, as described above. In some embodiments, a single transactional memory implementation may be configured to support both an RSM-like mechanism and BEHTM-like techniques in the same system.

An alternative approach to exploiting BEHTM in an STM system may involve executing a user transaction as usual in an STM system (e.g. using STM techniques), but using BEHTM techniques at commit time. For example, BEHTM techniques may be used to attempt to commit the entire transaction using one hardware transaction, in some embodiments. In such embodiments, if the transaction fails to commit, the system may be configured to use multiple hardware transactions to accelerate the data and metadata updates that would be made by an ordinary STM system (e.g., one without special hardware support).

In embodiments in which transactions read and record values from memory and/or associated metadata and reread them later to determine whether or not they have since changed, the entire user transaction may be committed in a single hardware transaction that iterates over the user transaction's read set. This may ensure that the memory locations (and/or associated metadata) have not changed since the execution of the user transaction. The hardware transaction may also iterate over the write set, copying the values written by the user transaction to the respective updated memory locations.

Embodiments in which transactions modify associated metadata so that a transaction that modifies a location may determine that a transaction has read the location and take action to ensure that the reading transaction is informed of the change may have an advantage in that they may not execute user code inside a hardware transaction, instead executing only library code of the hardware-assisted STM. As a result, a variety of likely causes of transaction aborts may be avoided, such as long delays, or failures due to instructions and/or events that are not supported by the underlying BEHTM feature. Therefore, this approach may exploit BEHTM techniques for a larger set of transactions than earlier systems that could only use BEHTM to execute a user transaction directly. However, this approach may in some embodiments have the disadvantage of incurring overhead similar to that of an ordinary STM system during execution of the user transactions (e.g., in systems that employ instrumentation of transactional read and write operations, construction of software read and write sets, systems that ensure read set consistency, etc.). This approach may, however, exploit an RSM-like feature to improve performance of executing a user transaction, in some embodiments. Thus, in some such embodiments, it may be beneficial to have both RSM-like mechanisms and BEHTM-like features in the same system.

As described above, a system that includes both RSM-like mechanisms and BEHTM techniques may exploit the RSM mechanism during execution of the user transaction and the BEHTM techniques during commit, in some embodiments. This approach may in some embodiments entail some unnecessary redundancy, due to the lack of integration of the RSM and BEHTM features. In particular, as described above, the BEHTM transaction used in the commit phase must iterate over the read set to revalidate the memory locations (and/or metadata) read during execution of the transaction. Apart from the obvious overhead of doing this iteration, there may also be indirect costs associated with this approach.

First, this approach may necessitate the maintenance of a read set. As explained below, a system that integrates these features (rather than merely providing them as separate mechanisms) may facilitate an optimized mode in which, at least in some cases, there may be no need for a transaction to maintain a read set, thus eliminating a significant source of overhead. Second, the window between executing the user transaction in software (assisted by the RSM feature) and the beginning of the BEHTM transaction for commit may complicate the software, introducing more overhead and complexity. The overhead associated with these two requirements may in some embodiments be reduced or eliminated by using a combined and integrated RSM+BEHTM feature, as described in more detail below.

An integrated RSM+BEHTM feature may support the ability for the locations being monitored by the RSM feature to quickly become part of the read set of a subsequent BEHTM transaction, while guaranteeing that the BEHTM transaction does not commit successfully if there is any risk that any of the monitored locations has changed. In some embodiments, this ability may eliminate the need for the commit-time BEHTM transaction to explicitly iterate over the software read set. Furthermore, in at least some cases, this may facilitate an optimized mode in which it is not even necessary for the software to maintain a read set, thus eliminating significant overhead from the execution of the user transaction.

Figure 3:
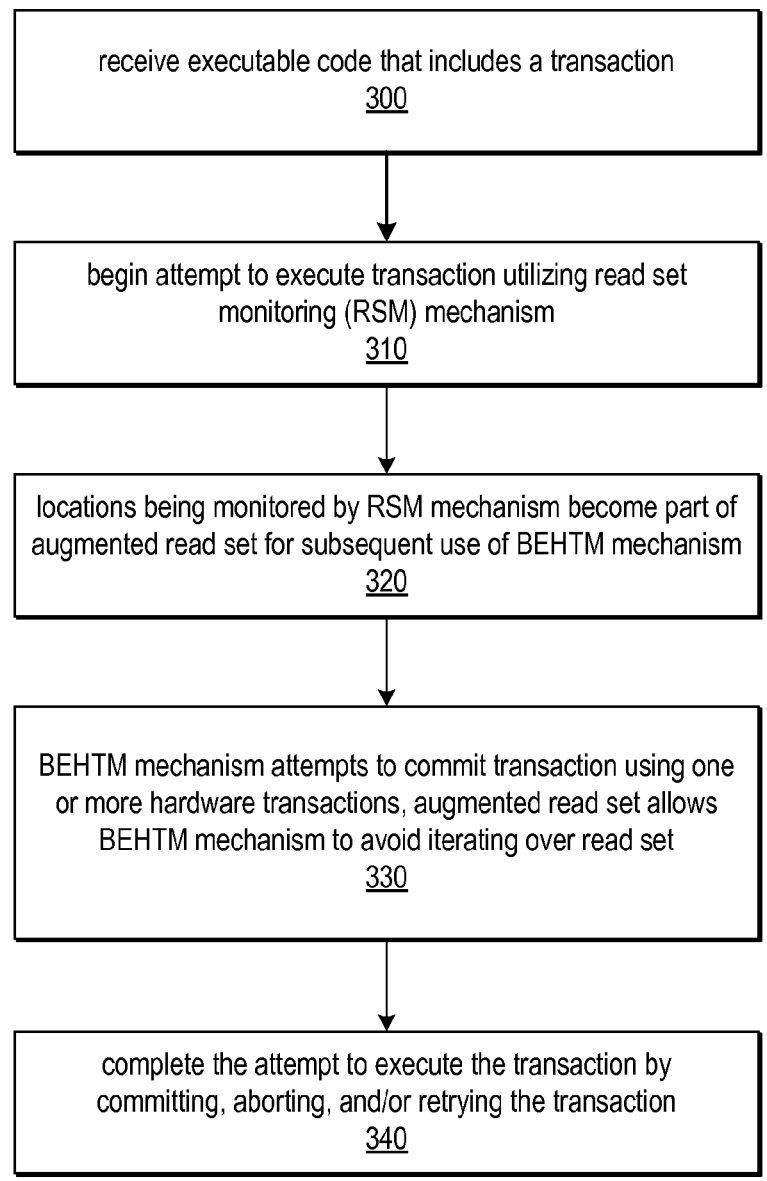
FIG. 3 is a flow diagram illustrating the use of a read set monitoring mechanism and a best effort hardware transactional memory mechanism integrated in a single transactional memory implementation, according to one embodiment.

The system and methods described above for integrating a read set monitoring (RSM) mechanism and a best effort hardware transactional memory (BEHTM) mechanism used to attempt to commit transactions in a single transactional memory implementation may be further illustrated by the flow chart of FIG. 3, according to one embodiment. In this example, an execution environment (e.g., a computer system configured to support one or more transactional memory implementations) receives executable code that includes a transaction, as in 300. An attempt to execute the transaction may begin, and may utilize an RSM mechanism to monitor locations read by the transaction and to determine whether or not the set of locations read by the transaction have changed since, as described above. This is illustrated as 310.

In this example, during the current attempt to execute the transaction, various locations are monitored by the RSM mechanism, and these locations become part of a read set for subsequent use by the BEHTM mechanism, as in 320. In some embodiments, this may take place automatically and without programmer, user, and/or software intervention. In some embodiments, the integration of the RSM and BEHTM mechanisms may guarantee that BEHTM mechanism cannot successfully commit the transaction if there is any risk that any of the monitored locations has changed.

As illustrated in FIG. 3, at some point, as the current attempt to execute the transaction continues, the BEHTM mechanism may be used to attempt to commit the transaction, as in 330. As described above, because the BEHTM mechanism may be integrated with the RSM mechanism such that the monitored locations are included in the BEHTM's read set. Thus, the BEHTM transaction used to commit the user transaction may avoid the need to iterate over the read set. As shown at 340, the current attempt to execute the transaction may end when the transaction is successfully committed (e.g., by the BEHTM mechanism), is aborted (e.g., by the BEHTM mechanism in response to one or more of the read set locations having likely changed), or is retried (e.g., when another attempt to execute the transaction is initiated by re-starting the execution from the beginning subsequent to being aborted and/or following detection of any of various error conditions).

As discussed above, an integrated RSM+BEHTM feature may be more valuable (e.g., in terms of its effect on cost and/or performance of the system) than an un-integrated combination of these individual features in the same system. This benefit may be due, at least in part, to the ability for the locations monitored by the RSM to become part of a BEHTM transaction's read set quickly, without software intervention, and without the possibility of the monitored locations changing between the monitoring and the BEHTM transaction committing successfully.

Persons skilled in the art will appreciate that there are a variety of hardware implementation approaches for supporting RSM-like features, and similarly for supporting BEHTM-like features. In general, any of a number of approaches may be used to integrate the two features to provide additional benefit over their separate functionality, and the additional resources and complexity required to support the combination may in some embodiments be very small.

Integration of two best effort transactional support mechanisms, as described herein, may be further illustrated by the following concrete example. In this example, a system may be configured to support the integration of an RSM mechanism that uses special "mark bits" on cache lines to indicate that one or more memory locations included in the cache line is being monitored by the RSM feature, as described above, together with a BEHTM feature that similarly uses cache-line marking and monitoring to track the read set of BEHTM transactions and to detect potential conflicts with the transaction. In this example, the two mechanisms may be integrated as follows: when the hardware transaction begins, the lines marked for read set monitoring by the RSM feature automatically become part of the read set of the transaction, because the mark bits are already set.

Depending on the BEHTM implementation and its interaction with other features, some modifications to the standard BEHTM mechanism may be required to support its integration with the RSM mechanism. For example, if the mark bits are "flash cleared" when a transaction begins, it may be necessary to modify the design so that the bits are instead flash-cleared when a hardware transaction commits or aborts, so that marks accumulated by the RSM feature are retained when a BEHTM transaction begins. Alternatively, depending on the interface of the RSM feature, these bits may be cleared when RSM monitoring begins. This approach may be particularly attractive because it may allow for the possibility of having multiple hardware transactions commit contingent on the set of locations monitored by a single monitoring session. In this case, it may be preferable to use separate mark bits for RSM and for monitoring the read set of BEHTM transactions, so that the latter may be cleared at the end of a transaction, while the former are retained until explicitly cleared by software.

Integration of other combinations of RSM and BEHTM features may be performed in a similar manner, in different embodiments. While the integration illustrated in the example above uses the same hardware resources and logic for tracking locations monitored by the RSM features and for tracking the read set of a BEHTM transaction, this is by no means a requirement in order to apply the system and methods described herein.

A variety of approaches may be employed for integrating different combinations of RSM and BEHTM features, and/or for transferring state used by the RSM feature to create an initial read set for a BEHTM transferring. For example, some variants of the RSM feature may use different state on cache lines for monitoring cache lines for the purposes of the RSM feature. In such embodiments, additional logic may be provided to set the transactional mark bits of all lines being monitored by the current thread when beginning a hardware transaction, so that these locations immediately become part of the read set of the hardware transaction.

In still other embodiments, an entirely different mechanism may be used by an RSM feature to monitor locations while executing a hardware transaction that uses different mechanisms to track its read set. In such embodiments, the BEHTM mechanism may be modified to ensure that the transaction does not commit successfully in the case that the RSM mechanism detects a possible change to a monitored location. Thus, while it may be particularly convenient, simple, and/or cheap to closely integrate the mechanisms used by the RSM and BEHTM features, this is by no means necessary in order to apply the system and methods described herein.

Note that best effort transactional memory support mechanisms may significantly simplify hardware design, because difficult corner cases, instructions, and events may in some embodiments be handled simply by such mechanisms. For example, in the case of RSM, the mechanism may be configured to conservatively report that some monitored locations may have changed. Similarly, in the case of BEHTM, the mechanism may be configured to conservatively abort the transaction. These properties may be particularly powerful when integrating multiple best effort mechanisms. This is because while the interaction of these mechanisms may result in additional difficult cases, the same simple solution may always be available (e.g., because each of the features is a best effort mechanism).

While several detailed examples included herein involve the integration of a RSM-type mechanism and a BEHTM mechanism for committing transactions, the methods may be generally applicable to integration of a wide variety of best effort hardware transactional support mechanisms. In addition, in some embodiments more than two such best effort mechanisms may be integrated for use in a single transactional memory implementation and/or for use in a single attempt to execute a transaction. The integrated best effort mechanisms may in some embodiments include mechanisms designed (and/or used) primarily for a purpose other than transactional memory support that may be exploited for use in a transactional memory implementation. For example, various cache marking mechanisms may be exploited by one or more other best effort mechanism in a transactional memory implementation, thereby integrating them with the other hardware support mechanism(s). In another example, a Bloom filter-type mechanism (or another hardware support mechanism that uses a hash of an address to determine if data associated with the address may have been modified) may be integrated with one or more other hardware support mechanisms in a transactional memory implementation. As previously noted, in some embodiments, different combinations of best effort mechanisms may be employed in different attempts to execute a transaction. In some embodiments, a last-resort STM approach may be invoked in order to guarantee that the transaction will eventually succeed.

Note also that some of the best effort hardware support mechanisms may provide various levels of "guarantees" regarding their efforts. In some embodiments, different best effort mechanisms may provide a particular level of guarantee regarding a determination that a transaction should succeed or fail (e.g., in response to the possibility that a monitored value has changed). For example, some best effort mechanisms may guarantee that no false negative results may occur (e.g., failures of transactions that should have successfully committed), some may guarantee that no negative results (transaction failures) are possible, and some may guarantee that no false positives may occur (e.g., commitment of transactions that should have failed to commit). In some embodiments, a best effort hardware mechanism may be configured to provide an indication to the runtime system of the level of guarantee provided by the mechanism, and this indication may be used in selecting a mechanism to apply in a given situation. For example, a Bloom filter-type mechanism may return feedback through a defined interface (e.g., in response to a query) indicating that it will never forget that it was directed to monitor a given address, even though it may in some cases report that such monitoring failed, even if it did not fail. In this example, the mechanism may in some cases also report that it is monitoring something that it was not directed to monitor.

Note also that the integration of best effort hardware support mechanisms may support operations and/or structures in a given system other than, or in addition to, transactional memory implementations. For example, in one embodiment, the integration of an RSM mechanism and a BEHTM mechanism may facilitate an efficient implementation of a skip-list, even though a skip-list may not "execute transactions" per se.

The power of integrating best effort transactional memory support mechanisms may be realized beyond the design of individual systems. For example, such an approach may also help to provide an evolution path in which different processors from different groups and/or companies may provide different best effort mechanisms, and may incrementally add new best effort features. Thus, for example, one processor might implement an RSM feature first, while another might implement a BEHTM feature first. This apparent divergence may not be permanent, as each processor may subsequently add and integrate the other best effort feature. Over time, this approach may assist designers in limiting the apparent divergence of different processor lines.

Because the integrated features described herein comprise combinations of best effort features, software configured to use them must be prepared for the possibility that the feature is not effective in certain circumstances. In the extreme case, this may mean that the software must work correctly even if a particular best effort feature is always ineffective (e.g., because it does not yet exist). Therefore, in some embodiments, software may be written so that it can exploit whichever best effort features have been implemented in a given processor, but so that it can also function correctly despite the absence of those that have not. In some embodiments, a compiler may be configured to generate code configured to support a variety of best effort mechanisms (e.g., various hardware-assistance mechanisms) and standard, default, and/or last-resort techniques (e.g., more generic STM implementations).

In such embodiments, programmers may write transaction code once using familiar coding styles, but the transaction may be effected according to the available distinct and/or integrated transactional memory support mechanisms. Programmers may not need to write specific versions of their code in order to take advantage of these different mechanisms, and may not even be specifically aware of the particular transaction implementations and/or support mechanisms employed. Instead, the transaction code written by the programmer may be translated, replaced or transformed (e.g., by the compiler) into code that is configured to implement transactions according to any of various transactional memory techniques using various underlying distinct and/or integrated support mechanisms (e.g., the best effort mechanisms described herein). In some embodiments, the particular techniques employed in executing each transaction may not be decided until runtime, and may be different for different execution runs depending on the available resources, on available best effort support mechanisms, and/or on the current workload, among other factors. At runtime, any of the various implemented support techniques may be used to effect a given transaction. In some embodiments, if the first technique fails or is inappropriate for a particular transaction, the transaction may employ one or more different techniques in the same attempt to execute the transaction (e.g., in order to make additional progress following the application of the first technique). In other embodiments, two or more techniques may be employed serially or in parallel in a single attempt to execute a transaction as a matter of design, or as a matter of choice made at runtime.

As different flavors of hardware support for transactional memory emerge, it may be increasingly difficult to develop portable software that can take advantage of whatever special hardware features are provided by each target platform. Thus, it may be desirable to work towards some degree of uniformity in hardware support for transactions, so that eventually it will be possible to achieve the benefit of multiple hardware features on a variety of platforms. However, this may be challenging when different processors may adopt different features in different orders. Furthermore, different processors may implement different interfaces for similar best effort hardware features (because they may be integrated into different instruction set architectures, such as those based on various SPARC® processors or on x86 compatible processors).

As noted above, a portable transaction interface may be implemented by a variety of combinations of best effort hardware features, including none at all (in which case the interface may implemented entirely by software, without special hardware support). The features offered by this interface may be best effort mechanisms, for which implementation is always possible without the need for special hardware support. Software written to this interface (e.g., transaction support library functions) may be executable on a variety of platforms, and may take advantage of whichever best effort hardware features are included on each one, while not depending on any particular one.

A useful partial analogy may be system software (e.g., operating systems, virtual machines, etc.) which are often designed so that most of their code can be compiled for any system, while relatively small amounts of code that depend on particular processors or instruction sets are isolated in special machine-dependent libraries. For example, Solaris® uses "compare-and-swap" type instructions to implement synchronization mechanisms such as atomic counters. Because different processors provide different hardware instructions that can be used to implement such mechanisms, they are implemented in the platform-dependent libraries. Similarly, in some embodiments, a portable transaction interface, as described herein, may be implemented in libraries that are specific to a target execution environment (e.g., machine-dependent libraries, processor-specific libraries, platform-specific libraries) and that exploit whichever best effort hardware features are available in the target execution environment, and the remainder of the system or application may be written to the portable transaction interface, and may be machine-independent.

Figure 4:
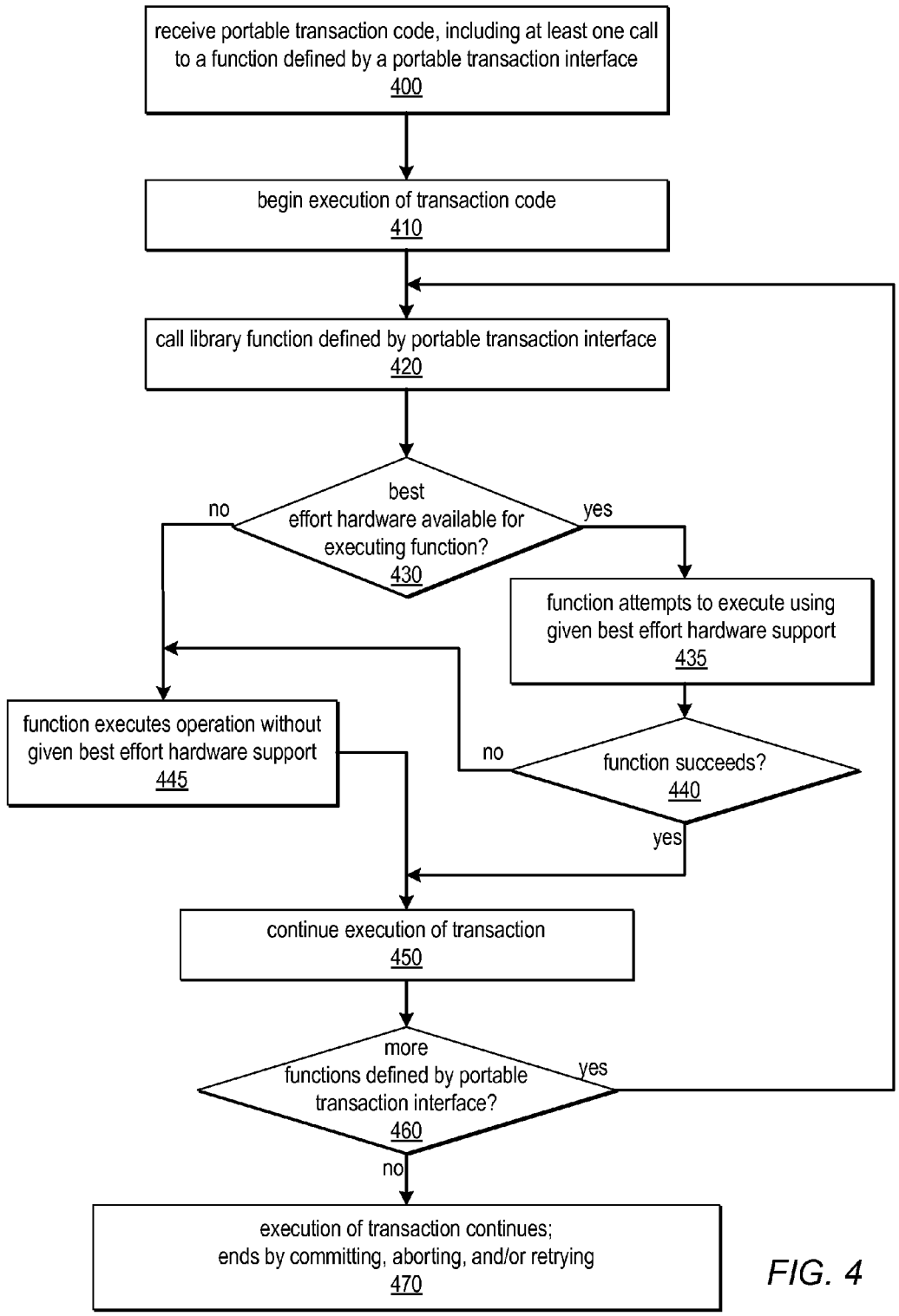
FIG. 4 is a flow diagram illustrating the use of a portable transaction interface to execute transactions using available best effort hardware support, according to one embodiment.

One embodiment of the use of a portable transaction interface to execute transactions using available best effort support mechanisms is illustrated by the flow chart in FIG. 4. In this example, a target execution environment (e.g., a computer system configured to support one or more transactional memory implementations) receives portable transaction code, as in 400. In different embodiments, this may comprise code that has been transformed by a transactional compiler to include calls to both generic transaction support functions and portable transaction interface functions and compiled for execution in various execution environments (e.g., linked with a generic transaction support library and a platform-specific portable transaction library), or code that will be compiled by a just-in-time transactional compiler during execution of the transaction code (e.g., in a managed runtime environment). In this example, the code includes at least one operation defined by a portable transaction interface, as described above. Execution of the transaction code may begin, as in 410. At some point during execution of the transaction, a call to a portable transaction interface function (e.g., a function defined by the portable transaction interface) may be encountered and the corresponding code in a portable transaction interface library may be executed to perform the function, as in 420.

If applicable best effort hardware support (e.g., hardware support for an RSM mechanism, a BEHTM mechanism usable to attempt commitment of the transaction, or other best effort hardware support) is available in the target execution environment, shown as the positive exit from 430, the function may be configured to attempt execution of the operation using a given best effort hardware support mechanism, as in 435. For example, if the target execution environment includes best effort hardware support, the portable transaction interface library function may exploit the best effort hardware support in attempting to execute the portable transaction interface operation.

In some embodiments, the portable transaction code may include an operation to query the target execution environment at runtime in order to determine which, if any, best effort hardware support mechanisms are available, or to determine if a given best effort mechanism is available, in the target execution environment. For example, the portable transaction code may include a call to a query function of a portable transaction interface library, and may continue on a selected one of two or more alternate execution paths dependent on which, if any, best effort hardware support mechanisms are determined to be available. One path may call a library function that exploits a given available best effort hardware support mechanism, while another path may call a library function that exploits a different best effort hardware support mechanism, or that calls a function to execute the operation without using any best effort hardware support mechanisms (e.g., if there are no appropriate mechanisms available to support the particular operation). In another embodiment, the portable transaction interface library function may determine which, if any, best effort hardware support mechanisms are available in the system, and may exploit one of them, as appropriate. In one example, the portable transaction interface library function may include a query or other operation to determine the available support mechanisms and may follow a particular one of two or more execution paths defined within the function depending on the results of the query operation. In another example, the portable transaction interface library function may be specific to the execution environment and may only include one execution path, which may exploit an available best effort hardware support mechanism in the system. In yet another example, the portable transaction interface library function may include multiple alternative execution paths and may select a particular one of the paths to follow dependent on whether prior execution of a different instance of this (or another) portable transaction interface library function successfully exploited a given best effort hardware support mechanism in the target environment, or on progress made by the current instance of this function to date.

As illustrated in FIG. 4, if the attempt to execute the operation using the given best effort hardware support mechanism is successful, shown as the positive exit from 440, execution of the portable transaction code may continue, as in 450. If not, shown as the negative exit from 440, the portable transaction interface function may be configured to execute the operation without using the given best effort hardware support mechanism, as in 445.

If, as shown by the negative exit from 430, a given best effort hardware support is not available in the target execution environment (or if an attempt to execute the operation using the given best effort hardware support mechanism fails), the portable transaction interface function may be configured to execute the portable transaction interface function without using the given best effort hardware support mechanism, as in 445. In one example, if a given best effort hardware support mechanism is not available, the portable transaction interface function may be configured to attempt to execute the operation using a different best effort hardware support mechanism. In another example, if a given best effort hardware support mechanism is not available, the portable transaction interface function may be configured to execute the operation using default and/or guaranteed methods (e.g., software transactional memory methods). In some embodiments, the portable transaction interface function may be configured to perform one or more additional attempts to execute the operation, in the event that one such attempt (e.g., using an available best effort hardware support mechanism) is unsuccessful, before resorting to a default or guaranteed method for performing the intended function (not shown).

As illustrated in FIG. 4, execution of the portable transaction code may continue following the execution of the portable transaction interface function, as in 450. If the portable transaction code includes additional portable transaction interface functions, shown as the positive exit from 460, the operations illustrated as 420-450 may be repeated for each additional portable transaction interface function included in the transaction code. This is shown as the feedback loop from 460 to 420. If there are no more portable transaction interface function remaining in the transaction code, shown as the negative exit from 460, execution of the transaction code may continue until it commits, is aborted, and/or is retried, as in 470. Note that, as discussed above, in some embodiments, a transaction may be aborted and/or retried before all of the code for the transaction has been executed (e.g., if the read set is found to be inconsistent, due to conflicts with other concurrently executing transactions, etc.) However, for simplicity, this is not shown in FIG. 4.

Note that the operations illustrated in FIG. 4 may be repeated when the same portable transaction code is received in a different execution environment, e.g., one that includes more, fewer, or different best effort hardware support mechanisms, or no best effort hardware support mechanisms at all. In some embodiments, the portable transaction code may comprise code that includes calls to generic transaction support library functions, which in turn include calls to portable transaction interface library functions, as described above, and which has been compiled and linked to the appropriate portable transaction interface library for execution in the different execution environment without changes to the original source code and/or generic transaction support library. In some such embodiments, the compiled code may be executable to determine (at runtime) whether appropriate best effort hardware support mechanisms are available to exploit when executing the transaction code. In other embodiments, the portable transaction code may comprise code to be compiled (and linked to the appropriate portable transaction interface library) by a just-in-time compiler in a managed runtime environment, as described herein.

Note that there may be various tradeoffs between the benefits of the abstraction and modularity provided by a portable transaction interface, as described herein, and the ability to take maximum advantage of the underlying hardware features. Nonetheless, the approach described herein may help to facilitate the development of system software and applications in a way that is platform independent. In various embodiments, software designers (e.g., application software designers or transaction support library designers) may be free to modify or bypass the interface (e.g., in whole or in part) in order to take maximum advantage of a particular hardware feature, at the cost of decreasing the portability of the software to other platforms. However, this may be done in a targeted way, in order to limit the impact on portability caused by a particular optimization. This approach may also help hardware designers to consider how proposed new features might interact with other existing features, and how they might be exploited by existing software (e.g., a transaction support library) that targets a given portable transaction interface, as described herein. In this way, the use of a portable transaction interface may help designers avoid unnecessary divergence of the hardware features supported by various platforms.

As described above, a portable transaction interface may in some embodiments support operations that allow software to interrogate the system to obtain information that helps it predict which features may be effective under particular circumstances, and/or to obtain feedback about reasons for any failure of various best effort hardware support mechanisms. For example, in one embodiment, software (e.g., a function in a portable transaction interface library) may base decisions about which mechanisms to attempt to use in a given set of circumstances, how often to retry, etc., on the results from such interrogation regarding functionality of the system and/or on feedback from failed operations. In such embodiments, software may avoid wasting time attempting to use a best effort feature that is not implemented, or that has been found to be ineffective, on a given platform.

As noted above, a portable transaction interface may evolve over time to support newly proposed best effort features and characteristics. For example, if a hardware vendor plans to provide support for (best effort) DCAS or NCAS (Double Compare-And-Swap or N-location Compare-And-Swap) operations, the portable transaction interface may be extended to allow software to use such features, without encoding platform-specific information about instructions used, layout of arguments, etc. A rich space of possibilities exists, including the possibility to support the integration of multiple best effort mechanisms, as described herein. For example, in one embodiment, the interface may provide a combined RSM+NCAS operation, such that an NCAS operation that succeeds only if a previously identified set of monitored locations has not since changed.

The system and methods for managing divergence of best effort transactional memory support mechanisms using a portable transaction interface are further illustrated by way of the following examples. In these examples, a portable transaction interface may support individual best effort RSM and BEHTM features, in addition to a combined best effort RSM+BEHTM feature, as described above. These examples illustrate how this interface may be implemented in a system that supports neither of these features, one feature but not the other, both features individually, or both features combined (as described above).

An example portable transaction interface may be used to illustrate the proposed approach. The pseudo-code below may represent various instructions, functions, methods, and/or operations defined by the portable transaction interface, and/or their implementations in various execution environments.

In this example, the interface may include variants on the following load function for various kinds of loads (byte, word, double word, etc.). These functions may be called directly by user code, but more likely are used in an STM library and/or in code produced by a transactional compiler.

```
loadtype PTI_loadAndMonitor(loadtype* addr)
                          // variants for all relevant kinds of loads
```

In this example, the portable transaction interface may also include operations to reset the monitoring capability, and to query it to see if loads monitored since the most recent reset are still valid.

```
void PTI_resetMonitoring( )
bool PTI_readsStillValid( )   // are all locations monitored since last reset
                              // guaranteed not to have changed since?
```

Finally, in this example, the portable transaction interface may include operations to begin and commit a transaction. In this example, arbitrary code may be executed between calls to PTI_beginTransaction( ) and PTI_commitTransaction( ) that returns 0 (indicating the transaction has started). In the case that the transaction aborts for any reason, control returns to the point immediately after the call to PTI_begin Transaction( ), which returns a non-zero value encoding feedback about the aborted transaction.

```
int PTI_beginTransaction( )    // returns 0 for starting txn, non-0 value
                               // encoding feedback about failure on abort
void PTI_commitTransaction( )
```

The example pseudo-code that follows illustrates how the interface above may be implemented in a variety of systems that provide various levels of hardware support for transactional memory and related mechanisms.

Example Implementation of Portable Transaction Interface in System with No Hardware Support In this example, because features exported by the interface are best effort, when there is no hardware support, the mechanism may "fail" in all interesting cases.

```
int tls_anyReadsMonitored = FALSE;    // tls prefix may indicate thread-local storage
loadtype PTI_loadAndMonitor(loadtype* addr) {
    tls_anyReadsMonitored = TRUE;
    return *addr;
}
void PTI_resetMonitoring( ) {
    tls_anyReadsMonitored = FALSE;
}
bool PTI_readsStillValid( ) {
    return !tls_anyReadsMonitored;       // Only an empty set can be monitored
                                         // successfully, any attempt
}                                        // to monitor variables fails
int PTI_beginTransaction( ) {
    return HTM_FEATURE_NOT_SUPPORTED;    // Non-zero value reporting
                                         // absence of hardware feature
}
int PTI_commitTransaction( ) {
    assert(0);                           // execution should never reach this point,
                                         // as PTI_beginTransaction always fails
}
```

Example Implementation of Portable Transaction Interface Using BEHTM Feature at Commit In the following example, if the available hardware support does not include an RSM feature, the implementation should always report that it failed to monitor any non-empty set of monitoring requests. Note that this example assumes a hardware transactional memory feature in which transactions are started using a special chkpt (checkpoint) instruction and are committed using a special commit instruction. This example also assumes that the chkpt instruction specifies an address to which control will transfer in the case that the transaction aborts, and that a special cps (checkpoint status) register provides feedback as to why the transaction failed.

```
int tls_anyReadsMonitored = FALSE;    // tls prefix may indicate thread-local storage
loadtype PTI_loadAndMonitor(loadtype* addr) {
    tls_anyReadsMonitored = TRUE;
    return *addr;
}
void PTI_resetMonitoring( ) {
    tls_anyReadsMonitored = FALSE;
}
bool PTI_readsStillValid( ) {
    return !tls_anyReadsMonitored;       // Only empty set of monitored locations
                                         // is valid, any attempt
}                                        // to monitor locations fails
int PTI_beginTransaction( ) {
    if (tls_anyReadsMonitored)
```

-continued

```
    return RSM_FEATURE_NOT_SUPPORTED;
                        // Non-zero value reporting absence of hardware feature
    chkpt failpath              // Use chkpt instruction to start transaction
    return 0;                   // Report successful start to transaction
failpath:
    return "failure reason"
                        // nonzero, generic interpretation of cps register, see below
}
int PTI_commitTransaction( ) {
    commit;                     // Use BEHTM commit mechanism to commit transaction
}
```

Note that in this example, the processor includes a checkpoint status (cps) register, which communicates information about the reason a transaction failed. In some embodiments, part of defining a portable transaction interface according to the approach described herein may involve defining a set of platform-independent return codes. For example, a set of possible codes may include the following:

```
#define REASON_UNKNOWN              1
#define READ_CONTENTION             2
#define WRITE_CONTENTION            3
#define READ_RESOURCES              4
#define WRITE_RESOURCES             5
#define INSTRUCTION_LIMITATON       6
#define EVENT_LIMITATION            7
#define RSM_FEATURE_NOT_SUPPORTED   8 // Attempted to make transaction
                        // contingent on monitoring, but no support for this
#define HTM_FEATURE_NOT_SUPPORTED   9 // Attempted hardware transaction,
                        // but no support for this
```

In some embodiments, different platforms may map their own specific failure feedback information to more generic ones, such as those shown above, so that platform-independent software may use them. The interface may also support interrogating the platform, or for platform-specific failure reasons, as appropriate. An alternative to providing information about failure reasons may be to provide advice about what to do next, such as:

```
            #define RETRY_NOW           1
            #define RETRY_AFTER_BACKOFF 2
            #define DO_NOT_RETRY        3
```

In such embodiments, different platforms may interpret their own platform-dependent failure feedback to provide advice about what to do next. In addition to providing feedback, a particular implementation of the portable transaction interface may take action to attempt to make future retries more likely to succeed. For example, a BEHTM feature may in some embodiments provide feedback that a transaction had failed due to a TLB miss on a given address, in which case the implementation of the interface for this system may take action to establish the required TLB mapping before returning advice to retry the transaction.

Example Implementation for Processor with RSM-Like Feature, but No BEHTM Mechanism The pseudo-code below may in some embodiments be used in an implementation that includes an RSM-like feature, as described above, but no other BEHTM support or hardware transaction mechanism.

```
bool tls_anyReadsMonitored = FALSE;
int tls_counterSnapshot;
loadtype PTI_loadAndMonitor(loadtype* addr) {
    if (!tls_anyReadsMonitored) {
        tls_anyReadsMonitored = TRUE;
```

-continued

```
        tls_counterSnapshot = readMarkCounter( ); // Snapshot mark counter
                        // for later comparison
    }
    return loadSetMark(addr); // Use RSM feature to load and set mark on
    addr
}
bool PTI_readsStillValid( ) {
    return !tls_anyReadsMonitored ||
        (tls_anyReadsMonitored && readMarkCounter( ) ==
        tls_counterSnapshot);
}
void PTI_resetMonitoring( ) {
    tls_anyReadsMonitored = FALSE;
    resetMarkCounter( );
}
int PTI_beginTransaction( ) {
    return HTM_FEATURE_NOT_SUPPORTED;
}
int PTI_commitTransaction( ) {
    assert(0);              // execution should never reach here,
                            // as PTI_beginTransaction always fails
}
```

Note that in some embodiments, more sophisticated implementations may be configured to exploit counter behavior, default values, etc. to eliminate lookups of thread-local state on every load.

Implementation Including Both RSM-Like Feature and BEHTM Commit

A portable transaction interface implementation for a processor with both an RSM-like feature and a BEHTM commit mechanism that are not integrated may include code similar to that illustrated above for these individual features, in some embodiments.

Implementation Including Integrated RSM-Like and BEHTM Commit Mechanisms

A portable transaction interface implementation for a processor with both an RSM-like feature and a BEHTM commit mechanism that are integrated, as described above, may include code similar to that illustrated by the example code below.

```
bool tls_anyReadsMonitored = FALSE;
int tls_counterSnapshot;
loadtype PTI_loadAndMonitor(loadtype* addr) {
    if (!tls_anyReadsMonitored) {
        tls_anyReadsMonitored = TRUE;
        tls_counterSnapshot = readMarkCounter( );
    }
    return loadSetMark(addr);
}
bool PTI_readsStillValid( ) {
    return !tls_anyReadsMonitored ||
        (tls_anyReadsMonitored && readMarkCounter( )
            == tls_counterSnapshot);
}
void PTI_resetMonitoring( ) {
    tls_anyReadsMonitored = FALSE;
    resetMarkCounter( );
}
int PTI_beginTransaction( ) {
    chkpt failpath            // Note that txn will now fail if there are
    return 0;                 // oustanding monitored lines that have been lost
                              // because RSM and BEHTM features
                              // are integrated in this case
failpath:
    return "failure reason"   // Interpretation of cps register (see above)
}
int PTI_commitTransaction( ) {
    commit( );
}
```

Figure 5:
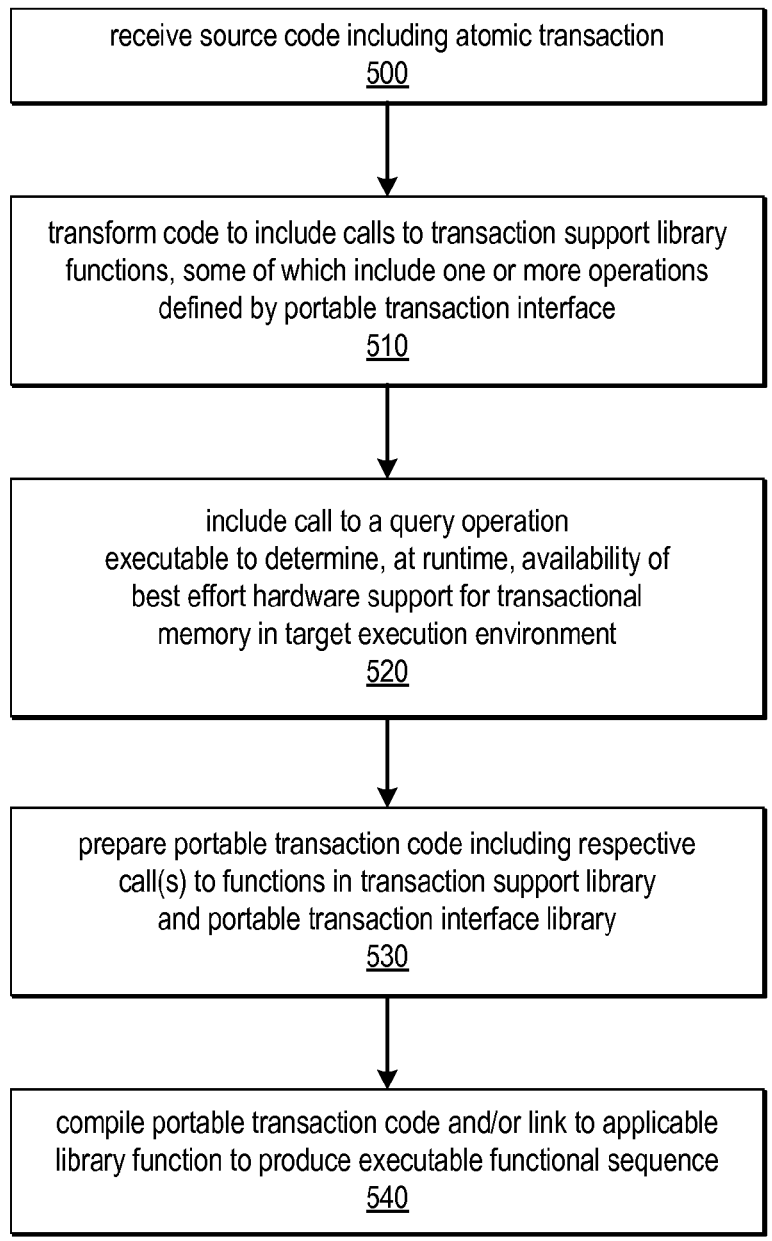
FIG. 5 is a flow diagram illustrating the preparation of portable executable transaction code using portable transaction interface library function(s), according to one embodiment.

One method of preparing portable transaction code and corresponding executable functional sequences using a portable transaction interface, as described herein, is illustrated by the flow chart of FIG. 5. In this example, source code (e.g., application source code) comprising an atomic transaction is received (e.g., by a transactional compiler), as in 500. As illustrated in FIG. 5, this source code may be transformed to include calls to one or more functions implemented in a transaction support library, as in 510. For example, the source code may include a section of code designated as an atomic transaction and a transactional compiler may be configured to insert calls to functions of a generic (e.g., processor-independent or platform-independent) transaction support library (e.g., to begin or end the transaction, to perform transactional loads and stores, to manage contention between competing threads, and/or to perform any bookkeeping associated with execution of the transaction). Some of these generic functions may in turn be executable with the help of one or more best effort hardware support mechanisms, if they are available in the target execution environment.

As discussed above, the software designer who designed the transaction support library may not have been aware of the availability of any given support mechanism in the target execution environment and/or may have intended the transaction support library to be reusable in multiple execution environments having a variety of best effort hardware transaction support mechanisms (or no such mechanisms). Therefore, some or all of the transaction support library functions may be designed to include calls to functions defined by a portable transaction interface, and execution environment-specific libraries implementing these functions may be configured to take advantage of available support mechanisms. For example, the transaction support library code may include calls to portable transaction interface functions such as those described above, or to any other operation(s) that may be suitable for inclusion in a portable transaction interface library (e.g., any operation that may utilize and/or be dependent on underlying best effort mechanisms when used with different hardware platforms, processors, execution environments, and/or in execution environments that may change over time). The portable transaction interface library may in various embodiments include only those functions corresponding to best effort hardware support mechanisms available in a given execution environment, or may include functions corresponding to a set of best effort hardware support mechanisms not all of which are necessarily available in the given target execution environment. Note that not all functions in a generic transaction support library may include calls to functions of an execution-environment-specific portable transaction support library, as not all of them may be able to take advantage of any available best effort hardware transaction support mechanisms.

As illustrated in FIG. 5, in some embodiments, the transactional compiler may include in the transformed code one or more query operations executable to determine (at runtime) which, if any, best effort hardware support mechanisms are available in the execution environment and/or to determine if a given mechanism is available in the execution environment, as in 520. In some embodiments the query operation may comprise a call to a query function of a portable transaction interface library in the functional sequence. In other embodiments, such a query operation (or call to a query function) may be included in one or more of the portable interface library functions that are called by a transactional support library function. In still other embodiments, such a query operation may be performed or invoked by system code (e.g., by the operating system, or by the virtual machine in a managed runtime environment). As discussed above, the execution path(s) in the resulting executable functional sequence, and/or in any of the transaction support library functions or portable transaction interface library functions called by the resulting executable functional sequence, taken at runtime may in some embodiments be selected dependent (at least in part) on the results of such a query. In other embodiments, additional feedback in the system may contribute to the selection of alternative execution paths and/or library functions at runtime. Note that some embodiments may not support such a query operation and/or other runtime decision-making described herein. However, the use of a portable transaction interface in transaction support library functions may allow application source code and/or transaction support library code to be reused (without changes) in various execution environments having a variety of best effort hardware transaction support mechanisms, including in execution environments in which such support evolves over time.

Note that in the example illustrated in FIG. 5, the transformed code (e.g., the portable transaction code prepared by a transactional compiler) may include one or more calls to transaction support library functions that may not be dependent on availability of best effort hardware support mechanisms. For example, in some embodiments, the functional sequence may include function calls executable to support transactions regardless of any best effort hardware support mechanisms that may be used to implement them (e.g., functions that begin or end transactions, perform bookkeeping operations associated with transactions, etc.). In another example, the functional sequence may include function calls executable to support transactions in the absence of any best effort hardware support mechanisms (e.g., contention management functions and/or other STM functionality to be used in the case that best effort hardware support mechanisms are unavailable or are ineffective).

Note also that in some embodiments, preparing the portable transaction code may include replacing one or more standard operations in the source code or in transaction support library code with those defined by a portable transaction interface, while in other embodiments, programmers may include operations conforming to such an interface when designing the source code for the atomic transaction or when designing the portable transaction support library code. In some embodiments, a transactional compiler may insert calls to functions of a portable transaction interface library or transaction support library in a pre-processing step prior to compiling the portable transaction code for execution. In other embodiments, a pre-processing operation (e.g., an operating system operation or virtual machine operation) may prepare the portable transaction code by inserting such calls into code to be compiled later by a just-in-time compiler.

In the example illustrated in FIG. 5, once the portable transaction code has been prepared (e.g., through transformation by a transactional compiler or pre-processing operation), it may be compiled and/or linked to the appropriate portable transaction interface libraries and/or transaction support libraries to produce an executable functional sequence configured to implement the transaction included in the source code, as in 540. Note that if the received source code includes additional atomic transactions (e.g., those including portable transaction interface operations), calls to additional transaction support library functions and/or portable transaction interface library functions may be included in the executable functional sequence corresponding to the source code (not shown).

Note that, in some embodiments, a just-in-time compiler and/or operating system may be configured to select (at runtime) a library of portable transaction interface functions from among several such libraries, based on the target execution environment. For example, in one embodiment, a target execution environment may be selected at compile time (e.g., based on a user-defined compile parameter, or on an operating system variable or other global variable). In this example, the compiler (and/or operating system) may be configured to determine whether (and, if so, which) best effort hardware support mechanisms are available in the target environment and to determine a corresponding library of functions to be linked to (or called by) the portable transaction code. In some embodiments, the compiler and/or operating system may be configured to determine individual portable transaction interface functions that are applicable to the targeted execution environment and the specific functionality of the code (e.g., the number, type, and/or frequency of transactions included therein, the number, type, and/or distribution of transactional memory locations accessed by the code, or other considerations). These individually selected functions may be selected from a single portable transaction interface library or from multiple such libraries, as applicable, in different embodiments.

Figure 6:
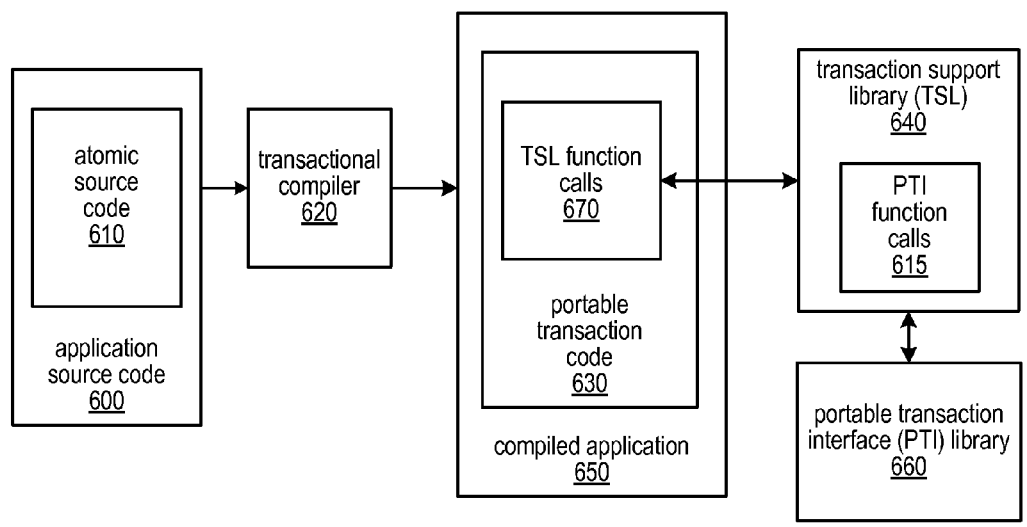
FIG. 6 is a block diagram illustrating a transactional compiler generating portable transaction code, as described herein.

FIG. 6 is a block diagram illustrating a transactional compiler 620 configured to analyze application source code 600, identify one or more instances of atomic source code 610 (e.g., one or more code sequences designated as atomic transactions), and then generate portable transaction code 630 to implement those transactions as part of compiled application 650, as described above. As described above, a compiler 620 may be configured to replace programmer written code, such as in atomic source code 610, that is to be executed atomically, with alternate code that includes calls to functions included in transactional support library 640 and/or portable transaction interface library 660. For example, a programmer may write the source code for an application, such as application source code 600, using atomic blocks to specify sets of instructions that should be executed atomically and/or as a transaction. In one such embodiment, the program may include sets of instructions to be executed atomically together within a set of curly brackets (e.g., "{ }") preceded by the term "atomic", thus indicating that the instructions within the brackets should be executed atomically.

Compiler 620 may, during the compilation of application source code 600, identify one or more collections of instructions to be executed atomically, such as by recognizing the atomic keyword, in one embodiment. In other embodiments, a programmer may use other or additional manners to indicate collections of instructions to be executed atomically. For example, in some embodiments, operations to be executed atomically may be designated using pairs of keywords, such as transaction_begin and transaction_end, to specify the beginning and end, respectively, of a group of operations. Thus, compiler 620 may be configured to identify collections of instructions or other fragments or portions of an application (e.g., functions, objects, method, classes, etc) by recognizing any of various language constructs that may be used to designate those instructions, fragments or portions to be executed atomically. A programmer may also use a particular language construct, such as an atomic keyword, to designate specific data structures, classes and/or objects that should be accessed using transactions. Thus, in some embodiments, compiler 620 may be configured to recognize such atomic structures, class and/or objects and generate code to ensure that they are accessed using transactions.

In some embodiments, functions in transaction support library 640 may include calls to one or more functions defined by a portable transaction interface, shown as PTI function calls 615. In such embodiments, compiler 620 may be configured to determine an appropriate portable transaction interface library 660 to be linked with portable transaction code 630 to produce compiled application 650, such that compiled application 650 is configured to execute the functionality of application source code 600 using available best effort hardware support for transactional memory, as described above. For example, portable transaction interface library 660 may in some embodiments include code executable to implement each operation defined by the portable transaction interface according to the configuration and features of the target execution environment, such as the functionality described above for various systems that include an RSM mechanism, a BEHTM mechanism, both mechanisms, or neither mechanism.

Additionally, compiler 620 may, in one embodiment, be configured to generate code configured to determine at runtime whether or not a particular best effort transactional memory support mechanism should be utilized in executing a given transaction. For example, compiler 620 may generate code configured to test a certain condition at runtime to determine whether or not a particular mechanism should be used in executing the transaction or to query the system to determine if a particular support mechanism is available.

While described herein mainly in terms of a compiler, compiler 620 may also represent other entities configured to generate portable transaction code 630, according to different embodiments. For instance, in one embodiment, compiler 620 may represent a code optimizer rather than a compiler. In another embodiment, compiler 620 may represent a just-in-time (JIT) compiler. In some embodiments, compiler 620 may represent an assembler rather than a compiler. In general, compiler 620 may represent any entity capable of and configured to generate portable transaction code for implementing transaction methods, including those that employ one or more best effort transactional memory support mechanisms, as described herein. While described herein as various software entities, compiler 620 may, in some embodiments, represent a hardware-based entity configured to generate portable transaction code for implementing transaction methods.

Application source code 600 and/or atomic source code 610 may represent code instructions in any of various languages, according to various embodiments. For example, in some embodiments, atomic source code 610 may represent code written in a high level programming language, such as C, C++, or Java™. In other embodiments, atomic source code 610 may represent binary instructions or assembly instructions. In yet other embodiments, atomic source code 610 may also represent compiler-intermediate instructions or virtual machine byte code instructions, such as Java™ byte code instructions.

As illustrated in FIG. 6, portable transaction code 630 may represent the code generated by compiler 620 and may include functional sequences executable to implement various transactions of the application. Portable transaction code 630 may be configured to utilize and/or include a library of transaction enabling code, such as transaction support library 640 and/or portable transaction interface library 660. Transaction support library 640 and/or portable transaction interface library 660 may include the actual functionality to execute transactions according to the various transaction techniques. For example, in some embodiments, library supported transaction code may include the functionality to begin and end transactions according to various software transactional memory techniques. Calls to functions of transaction support library 640 (shown in FIG. 6 as TSL function calls 670 within portable transaction code 650) may invoke functions of transaction support library 640 for beginning and committing software transactions, and for each transactional memory access. Additional functionality, such as the ability to support self-abort and nesting in transactions, may be provided by functions of transaction support library 640, in some embodiments.

Additionally, transaction support library 640 and/or portable transaction interface library 660 may include functionality to make decisions regarding which best effort transactional memory support mechanisms to use at any given time. Thus, in some embodiments, compiler 620 may be configured to generate portable transaction code 630 to include TSL function calls 670 configured to call functions provided by transaction support library 640 and/or portable transaction interface library 660 to determine which of various best effort mechanisms to use and also to call functions provided by transaction support library 640 and/or portable transaction interface library 660 to implement those mechanisms, if necessary. In other words, portable transaction code 630 may be configured to provide a framework for enabling runtime decisions regarding the use of integrated best effort transactional memory mechanisms and for the implementation of transaction techniques by transaction support library 640, portable transaction interface library 660, and/or integrated best effort hardware transaction support mechanisms. In some embodiments, portable transaction code 630 may be executable to query the system at runtime to determine which best effort mechanisms are implemented and/or their guaranteed level of effort, as described herein, and to invoke different functions provided by transaction support library 640 and/or portable transaction interface library 660 dependent on the response(s).

Note that when portable transaction code 630 is executed using TSL function calls 670 and one or more best effort hardware transactional memory support mechanisms, different operations of transaction techniques may be performed by TSL function calls 670, PTI function calls 615, or by the best effort support mechanism(s), according to various embodiments.

In some embodiments, a best effort hardware transactional memory technique may support particular I/O functionality as part of the transaction. In other embodiments, particular transaction techniques may not support particular functions or system calls, I/O calls, or certain memory access patterns. However, the application code that includes the unsupported instructions may not be executed every time the application is run. For example, within an atomic block, the unsupported code may only execute under certain conditions. In other words, the code in the atomic block may include one or more conditional branches only one of which may result in execution of the unsupported code. Thus, in some embodiments, portable transaction code 630 may be configured to begin execution of the transaction using a best effort mechanism that does not support the unsupported code, such as to use faster best effort hardware transaction techniques for those cases in which the unsupported code will not be executed, but to execute the transaction using a different best effort mechanism (or to execute the transaction without an integrated best effort mechanism) if and when the unsupported code is executed.

In another example, portable transaction code 630 may be configured to determine (e.g., at runtime) whether or not a transaction involves functionality not supported by a given best effort hardware transactional memory mechanism. If the transaction does involve functionality not supported by the best effort hardware transactional memory mechanism, portable transaction code 630 may be configured to utilize a different best effort transactional memory mechanism when executing the transaction. Note that in some embodiments, compiler 620 may be configured to determine whether or not a transaction, such as specified in an atomic block, involves code that is not supported by a particular best effort transactional memory mechanism and to generate portable transaction code 630 such that the particular mechanism will never be attempted for that transaction (e.g., library code configured to take advantage of the missing mechanism may not be called by and/or linked with transaction code 630).

Figure 7:
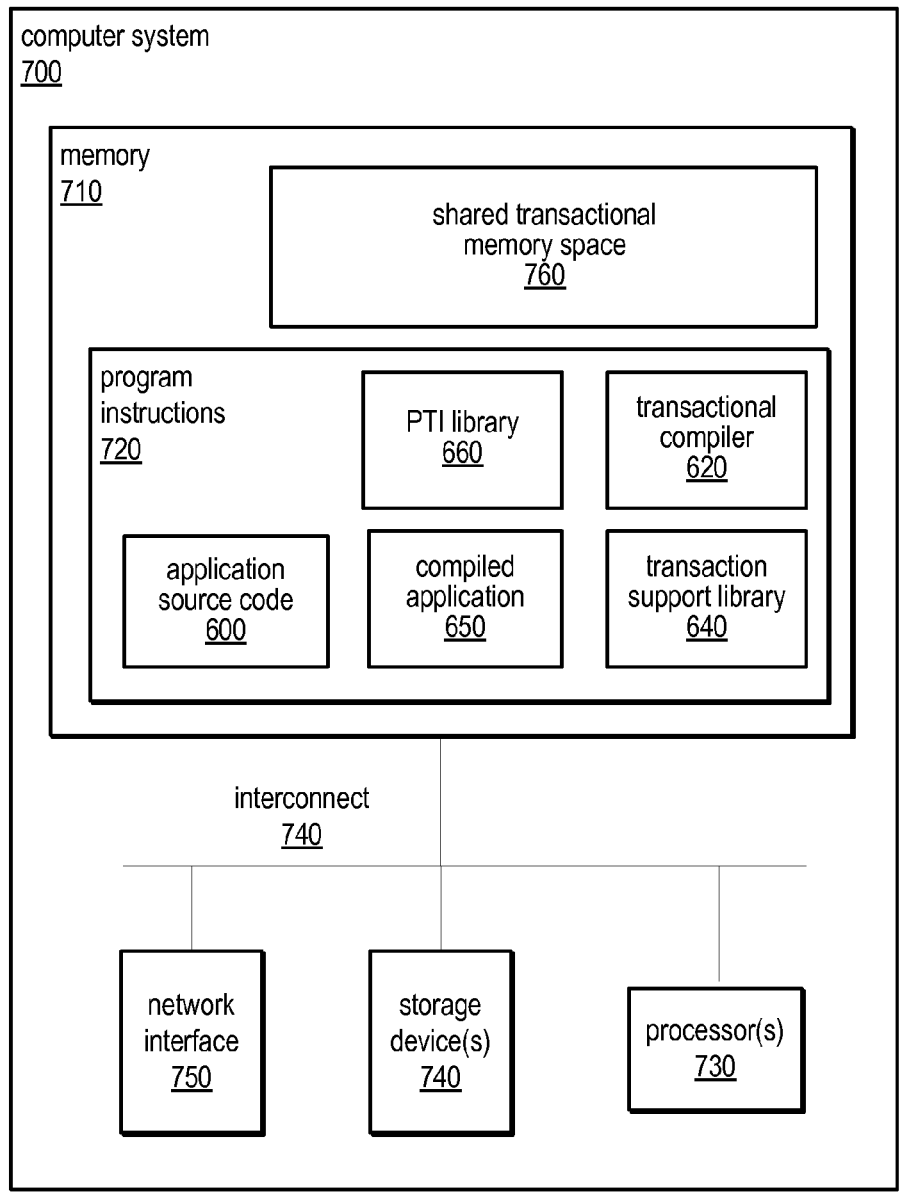
FIG. 7 is a block diagram illustrating an exemplary computer system configured to execute portable transaction code that utilizes best effort hardware support mechanisms, when available, according to one embodiment.

FIG. 7 illustrates a computing system configured to implement transactional memory utilizing multiple, integrated best effort support mechanisms, as described herein and according to various embodiments. Computer system 700 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In some embodiments, the described invention may be provided, at least in part, as a computer program product, or software, that may include a computer-readable storage medium having stored thereon instructions, which may be used to program a computer system (or other electronic devices) to perform a process according to the present invention. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 700 may include a processor unit 730 (possibly including multiple processors, a single-threaded processor, a multi-threaded processor, a multi-core processor, etc.). The computer system 700 may also include one or more system memories 710 (e.g., one or more of cache, SRAM, DRAM, RDRAM, EDO RAM, DDR RAM, SDRAM, Rambus RAM, EEPROM, etc.), a system interconnect 740 (e.g., LDT, PCI, ISA, etc.), a network interface 750 (e.g., an ATM interface, an Ethernet interface, a Frame Relay interface, etc.), and one or more storage device(s) 740 (e.g., optical storage, magnetic storage, etc.). The memory medium may include other types of memory as well, or combinations thereof. Embodiments of the invention may include fewer or additional components not illustrated in FIG. 7 (e.g., video cards, audio cards, additional network interfaces, peripheral devices, etc.). The processor unit 730, the storage device(s) 740, the network interface 750, and the system memory 710 are coupled to the system interconnect 740. One or more of the system memories 710 may embody a compiler configured to provide executable functional sequences for implementing atomic transactions. Additionally, one or more of the system memories 710 may embody an application including code specifying one or more atomic transactions.

In some embodiments, memory 710 may include program instructions 720 configured to implement a compiler, such as compiler 620, configured to generate executable code that includes atomic transactions and that may include calls to functions of transaction support library 640, and/or of PTI library 660, as described herein. Additionally, program instructions 720 may comprise application source code 600 including code configured to request or specify atomic transactions, as well as compiled application 650, as described herein. Program instructions 720 may also be configured to implement PTI library 660 and/or transaction support library 640, which are configured to provide various methods for implementing atomic transactions, as described herein.

Compiler 620, application source code 600, compiled application 650, PTI library 660, and/or transaction support library 640 may each be implemented in any of various programming languages or methods. For example, in one embodiment, compiler 620, PTI library 660, and transaction support library 640 may be JAVA based, while in another embodiments, they may be written using the C or C++ programming languages. Similarly, application source code 600 may be written using Java, C, C++, or another programming language, according to various embodiments. Moreover, in some embodiments, compiler 620, PTI library 660, transaction support library 640, and application source code 600 may not be implemented using the same programming language. For example, application source code 600 may be C++ based, while compiler 620 may be developed using C. As illustrated in FIG. 7, memory 710 may also include a shared transactional memory space 760, which may support and/or be accessed using STM, HTM, and/or HyTM transactions, in different embodiments.

While the invention has been described with reference to various embodiments, it will be understood that these embodiments are illustrative and that the scope of the invention is not limited to them. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A computer-implemented method, comprising:
preparing a portable code sequence corresponding to a source representation of code comprising an atomic transaction, wherein the portable code sequence is platform-independent; and
generating a functional sequence executable to perform the atomic transaction in a target execution environment;
wherein said preparing comprises:
including in the portable code sequence an operation defined by a portable transaction interface, wherein the operation defined by the portable transaction interface is platform-independent; and
wherein said generating a functional sequence comprises:
including in the functional sequence a call to a function executable to perform the operation defined by the portable transaction interface in the target execution environment in a manner that is dependent on whether it has been determined, at runtime and prior to attempting to perform the operation:
that a given best effort hardware transactional memory support mechanism is available to exploit when performing the operation in the target execution environment; or
that the given best effort hardware transactional memory support mechanism is not available to exploit when performing the operation in the target execution environment.

2. The method of claim 1,
wherein the function executable to perform the operation defined by the portable transaction interface is configured to exploit the given best effort hardware transactional memory support mechanism in response to determining that it is available to exploit in the target execution environment.

3. The method of claim 1,
wherein the function executable to perform the operation defined by the portable transaction interface is configured to perform the operation in the absence of the given best effort hardware transactional memory support mechanism in the target execution environment.

4. The method of claim 3,
wherein the function executable to perform the operation defined by the portable transaction interface is configured to exploit a different best effort hardware transactional memory support mechanism that is available in the target execution environment in the absence of the given best effort hardware transactional memory support mechanism in the target execution environment.

5. The method of claim 1,
wherein the function executable to perform the operation defined by the portable transaction interface is configured to perform the operation in the absence of any best effort hardware transactional memory support mechanisms in the target execution environment.

6. The method of claim 1,
wherein the function executable to perform the operation defined by the portable transaction interface is implemented in a library comprising one or more executable code sequences, each configured to exploit a respective one of one or more best effort hardware transactional memory support mechanisms that are available in the target execution environment.

7. The method of claim 1, further comprising:
compiling the portable code sequence for execution in the target execution environment dependent on a library comprising at least one function executable to perform the operation defined by the portable transaction interface.

8. The method of claim 1, wherein said preparing further comprises:
including in the portable code sequence a query operation, wherein the query operation is executable to query the target execution environment to determine, at runtime, whether the given best effort hardware transactional memory support mechanism is available to exploit when performing the operation in the target execution environment or is not supported in the target execution environment.

9. The method of claim 1,
wherein the function executable to perform the operation defined by the portable transaction interface comprises two or more alternative execution paths;
the method further comprising:
executing the functional sequence in the target execution environment; and
selecting one of the two or more alternative execution paths for execution at runtime dependent on whether the given best effort hardware transactional memory support mechanism was determined to be available in the target execution environment.

10. The method of claim 1,
wherein the function executable to perform the operation defined by the portable transaction interface comprises two or more alternative execution paths;
the method further comprising:
executing the functional sequence in the target execution environment; and
selecting one of the two or more alternative execution paths for execution at runtime dependent on execution of the functional sequence to date.

11. The method of claim 1, further comprising:
generating a functional sequence executable to perform the atomic transaction in a second target execution environment;
wherein said generating a functional sequence to perform the atomic transaction in a second target execution environment comprises:
including in the functional sequence a call to a function executable to perform the operation defined by the portable transaction interface in the second target execution environment dependent on whether the given best effort hardware transactional memory support mechanism was determined to be available in the second target execution environment;
wherein the availability of best effort hardware transactional memory support mechanisms in the target execution environment differs from the availability of best effort hardware transactional memory support mechanisms in the second target execution environment.

12. A non-transitory, computer-readable storage medium storing program instructions computer-executable to implement:
preparing a portable code sequence corresponding to a source representation of code comprising an atomic transaction, wherein the portable code sequence is platform-independent; and
generating a functional sequence executable to perform the atomic transaction in a target execution environment;
wherein said preparing comprises:
including in the portable code sequence an operation defined by a portable transaction interface, wherein the operation defined by the portable transaction interface is platform-independent; and
wherein said generating a functional sequence comprises:
including in the functional sequence a call to a function executable to perform the operation defined by the portable transaction interface in the target execution environment in a manner that is dependent on whether it has been determined, at runtime and prior to attempting to perform the operation:

that a given best effort hardware transactional memory support mechanism is available to exploit when performing the operation in the target execution environment; or that the given best effort hardware transactional memory support mechanism is not available to exploit when performing the operation in the target execution environment.

13. The non-transitory, computer-readable storage medium of claim 12, further storing:

program instructions configured to implement the function executable to perform the operation defined by the portable transaction interface;

wherein the function executable to perform the operation defined by the portable transaction interface is configured to exploit the given best effort hardware transactional memory support mechanism in response to determining that it is available to exploit in the target execution environment.

14. The non-transitory, computer-readable storage medium of claim 12, further storing:

program instructions configured to implement the function executable to perform the operation defined by the portable transaction interface;

wherein the function executable to perform the operation defined by the portable transaction interface is configured to perform the operation using a different best effort hardware transactional memory support mechanism that is available in the target execution environment in the absence of the given best effort hardware transactional memory support mechanism in the target execution environment.

15. The non-transitory, computer-readable storage medium of claim 12, further storing:

program instructions configured to implement the function executable to perform the operation defined by the portable transaction interface;

wherein the function executable to perform the operation defined by the portable transaction interface is configured to perform the operation in the absence of any best effort hardware transactional memory support mechanisms in the target execution environment.

16. The non-transitory, computer-readable storage medium of claim 12, further storing:

a library comprising one or more program instruction sequences executable to exploit the given best effort hardware transactional memory support mechanism in the target execution environment;

wherein the one or more program instruction sequences comprise the function executable to perform the operation defined by the portable transaction interface.

17. A system, comprising:

one or more processors; and a memory coupled to the one or more processors;

wherein the memory comprises:

a shared transactional memory space accessible by transactions included in one or more threads executing on the one or more processors;

program instructions representing an atomic transaction directed to the shared transactional memory space and executable by the one or more processors to implement the transaction; and program instructions representing a function executable by the one or more processors to perform an operation defined by a portable transaction interface, wherein the program instructions representing the function comprise program instructions that are configured to exploit a given best effort hardware transactional memory support mechanism in the system;

wherein the program instructions representing the atomic transaction comprise a call to the function; and wherein execution of the function is dependent on whether it has been determined, at runtime and prior to attempting to perform the operation:

that the given best effort hardware transactional memory support mechanism is available to exploit when performing the operation in the system; or that the given best effort hardware transactional memory support mechanism is not available to exploit when performing the operation in the system.

18. The system of claim 17, wherein the function is further configured to perform the operation using a different best effort hardware transactional memory support mechanism in the absence of the given best effort hardware transactional memory support mechanism in the system.

19. The system of claim 17, wherein the function is further configured to perform the operation in the absence of any best effort hardware transactional memory support mechanisms in the system.

20. The system of claim 17, wherein the function is further configured to query the system to determine, at runtime, whether the given best effort hardware transactional memory support mechanism is available to exploit when performing the operation in the system or is not supported in the system.

* * * * *